(12) United States Patent
Mathurin

(10) Patent No.: US 9,462,340 B1
(45) Date of Patent: Oct. 4, 2016

(54) VOICE/MANUAL ACTIVATED AND INTEGRATED AUDIO/VIDEO MULTI-MEDIA, MULTI-INTERFACE SYSTEM

(76) Inventor: Trevor Mathurin, San Ramon, CA (US)

( * ) Notice: Subject to any disclaimer, the term of this patent is extended or adjusted under 35 U.S.C. 154(b) by 0 days.

(21) Appl. No.: 13/273,129

(22) Filed: Oct. 13, 2011

(51) Int. Cl.
*H04N 7/173* (2011.01)
*H04N 21/462* (2011.01)
*H04N 21/4782* (2011.01)

(52) U.S. Cl.
CPC ...... *H04N 21/4622* (2013.01); *H04N 7/17318* (2013.01); *H04N 21/4782* (2013.01)

(58) Field of Classification Search
CPC .................................................. H04N 21/4622
USPC ........................................................ 725/109
See application file for complete search history.

(56) References Cited

U.S. PATENT DOCUMENTS

| | | | |
|---|---|---|---|
| 4,700,377 A | | 10/1987 | Yasuda et al. |
| 4,721,954 A | | 1/1988 | Mauch |
| 4,797,924 A | | 1/1989 | Schnars et al. |
| 5,345,538 A | | 9/1994 | Narayannan et al. |
| D358,593 S | | 5/1995 | Oba |
| 5,498,003 A | * | 3/1996 | Gechter ........................... 463/31 |
| 5,715,416 A | * | 2/1998 | Baker ............................ 715/839 |
| D400,531 S | | 11/1998 | Kokkinis |
| 5,872,575 A | * | 2/1999 | Segal ............................ 345/473 |
| D408,412 S | | 4/1999 | Zeitman |
| 5,991,637 A | | 11/1999 | Mack, II et al. |
| 6,065,042 A | * | 5/2000 | Reimer et al. ................. 709/203 |
| 6,097,393 A | * | 8/2000 | Prouty et al. ................. 345/419 |
| 6,175,356 B1 | | 1/2001 | Jung |
| 6,409,602 B1 | * | 6/2002 | Wiltshire et al. ............... 463/42 |
| 6,542,870 B1 | | 4/2003 | Matsumoto |
| 6,606,381 B1 | | 8/2003 | Wunsch |
| 6,621,938 B1 | | 9/2003 | Tanaka et al. |
| 6,654,721 B2 | | 11/2003 | Handelman |
| 6,658,662 B1 | * | 12/2003 | Nielsen ......................... 725/109 |
| 6,941,181 B1 | | 9/2005 | Mathurin |
| 7,000,242 B1 | * | 2/2006 | Haber ............................ 725/43 |
| 7,054,831 B2 | * | 5/2006 | Koenig ........................ 705/14.5 |
| 7,162,197 B2 | * | 1/2007 | Kitamura ...................... 434/317 |
| 7,653,921 B2 | * | 1/2010 | Herley ..................... H04N 7/16 382/100 |
| 7,664,678 B1 | * | 2/2010 | Haber ........................... 705/26.9 |

(Continued)

FOREIGN PATENT DOCUMENTS

GB 2298552 9/1996

OTHER PUBLICATIONS

Block, Ned. "Psychologism and Behaviorism." The Philosophical Review LXXXX, No. 1, Jan. 1981: 5-43.*

(Continued)

*Primary Examiner* — Nasser Goodarzi
*Assistant Examiner* — Michael B Pierorazio
(74) *Attorney, Agent, or Firm* — Seth H. Ostrow, Esq.; Meister Seelig & Fein LLP

(57) ABSTRACT

An enhanced form of edited interactive audio and video content delivered through a subscriber based network system and accessed by several unique multimedia interface devices. These unique multimedia interface devices can also create and edit both user generated audio and video content into this enhanced form of edited interactive audio and video content. The present invention will incorporate both voice and manual activation as an embedded technology into all multi-media and user generated audio/video content.

24 Claims, 14 Drawing Sheets

(56) References Cited

U.S. PATENT DOCUMENTS

| | | | |
|---|---|---|---|
| 7,715,642 B1* | 5/2010 | Collins et al. | 382/242 |
| 7,735,105 B2* | 6/2010 | Kato | G06Q 30/02 704/231 |
| 8,043,156 B2* | 10/2011 | Ackley et al. | 463/23 |
| 8,079,054 B1* | 12/2011 | Dhawan et al. | 725/105 |
| 8,221,220 B2* | 7/2012 | Ackley et al. | 463/23 |
| 2001/0001160 A1* | 5/2001 | Shoff et al. | 725/51 |
| 2001/0037303 A1* | 11/2001 | Mizrahi | 705/52 |
| 2001/0039571 A1* | 11/2001 | Atkinson | 709/217 |
| 2001/0053996 A1* | 12/2001 | Atkinson | 705/14 |
| 2002/0033844 A1* | 3/2002 | Levy et al. | 345/744 |
| 2002/0052746 A1* | 5/2002 | Handelman | 704/270 |
| 2002/0069405 A1* | 6/2002 | Chapin et al. | 725/32 |
| 2002/0133562 A1* | 9/2002 | Newnam | G06Q 30/02 709/216 |
| 2002/0162117 A1* | 10/2002 | Pearson | H04N 5/445 725/109 |
| 2003/0056212 A1* | 3/2003 | Siegel et al. | 725/31 |
| 2003/0217210 A1* | 11/2003 | Carau, Sr. | 710/302 |
| 2004/0068536 A1* | 4/2004 | Demers et al. | 709/201 |
| 2004/0073493 A1* | 4/2004 | Kato | G06Q 30/02 705/500 |
| 2005/0066352 A1* | 3/2005 | Herley | H04N 7/16 725/19 |
| 2005/0144024 A1* | 6/2005 | Wojton et al. | 705/1 |
| 2005/0267813 A1* | 12/2005 | Monday | 705/26 |
| 2006/0123451 A1* | 6/2006 | Preisman | 725/86 |
| 2006/0184579 A1* | 8/2006 | Mills et al. | 707/104.1 |
| 2006/0291483 A1* | 12/2006 | Sela | 370/401 |
| 2008/0015864 A1* | 1/2008 | Ross et al. | 704/275 |
| 2008/0089659 A1* | 4/2008 | Clapper | 386/46 |
| 2008/0115655 A1* | 5/2008 | Weng et al. | 84/609 |
| 2008/0282283 A1* | 11/2008 | Hilton et al. | 725/5 |
| 2008/0285940 A1* | 11/2008 | Kulas | 386/52 |
| 2008/0295129 A1* | 11/2008 | Laut | 725/34 |
| 2009/0094632 A1* | 4/2009 | Newnam | H04N 7/17318 725/24 |
| 2009/0281908 A1* | 11/2009 | Wong | 705/26 |
| 2009/0293081 A1* | 11/2009 | Pirani | H04N 7/17318 725/25 |
| 2009/0299752 A1* | 12/2009 | Rodriguez et al. | 704/275 |
| 2010/0131385 A1* | 5/2010 | Harrang et al. | 705/26 |
| 2010/0256561 A1* | 10/2010 | Gillespie et al. | 604/151 |
| 2010/0283741 A1* | 11/2010 | Heintze et al. | 345/173 |
| 2010/0332570 A1* | 12/2010 | Roberts et al. | 707/912 |
| 2011/0137753 A1* | 6/2011 | Moehrle | 705/27.1 |
| 2011/0138326 A1* | 6/2011 | Roberts et al. | 715/808 |
| 2011/0276334 A1* | 11/2011 | Wang et al. | 704/270 |
| 2011/0310580 A1* | 12/2011 | Leung | 361/807 |
| 2012/0016678 A1* | 1/2012 | Gruber | G06F 17/3087 704/275 |
| 2012/0084811 A1* | 4/2012 | Thompson et al. | 725/34 |
| 2012/0204207 A1* | 8/2012 | Clapper | 725/32 |
| 2014/0278834 A1* | 9/2014 | Lautz | G06Q 30/0203 705/12 |

OTHER PUBLICATIONS

Bruner, Scott. Police Quest: Open Season Review. Adventure Gamers, May 10, 2013. Web. Jul. 26, 2013. http://www.adventuregamers.com/articles/view/24244.*

Hardcore Gaming 101. Police Quest p. 2. Web. Jan. 31, 2011. http://www.hardcoregaming101.net/policequest/policequest2.htm*

Linkola, Joonas. The Curse of Monkey Island. Adventure Classic Gaming, Mar. 11, 2006. Web. Oct. 3, 2008. http://www.adventureclassicgaming.com/index.php/site/reviews/51/.*

Maniac Mansion for Nintendo Entertainment System (NES). Instruction Manual [online]. Jaleco, 1990 [retrieved on Aug. 11, 2005]. Web. http://members.fortunecity.com/harang/nesmanual.html.*

Moffett, Betty. Police Quest: Daryl F. Gates' Open Season. Adventure Classic Gaming, Feb. 25, 2006. Web. Mar. 25, 2006. http://www.adventureclassicgaming.com/index.php/site/reviews/62/.*

Sierra Entertainment. Daryl F. Gates' Police Quest Open Season. Sierra Ent., 1996. Microsoft Windows CD-ROM.*

Turing, A.M. Computing machinery and intelligence. Mind, 59. (1950): 433-460.*

Wikipedia. Myst. Web. Oct. 3, 2008. http://en.wikipedia.org/wiki/Myst.*

Wikipedia. Police Quest IV: Open Season. Web. Feb. 4, 2008. http://en.wikipedia.org/wiki/Police_Quest_IV:_Open_Season.*

Wikipedia. SCUMM. Web. Oct. 6, 2008. http://en.wikipedia.org/wiki/SCUMM.*

Wikipedia. The Curse of Monkey Island. Web. Oct. 3, 2008. http://en.wikipedia.org/wiki/Curse_of_monkey_island.*

* cited by examiner

DEVICES: 36
BASE UNIT,
BASE UNIT REMOTE CONTROL,
PORTABLE UNIT,
VOICE ACTIVATED WIRELESS
HEADSET/EARPIECE,
LIGHT SWITCH WALL MOUNTED
UNIVERSAL REMOTE,
LAPTOP PC

34

| | |
|---|---|
| MICROPHONE | 38 |
| SPEAKER | 40 |
| MICROPROCESSOR | 42 |
| STORAGE MEDIUM | 44 |
| MEMORY | 46 |
| COMM. CIRCUIT | 48 |

VOICE AND MANUAL ACTIVATED TASK SOFTWARE 50

WIRELESS, CELLULAR, SATELLITE AND LAND LINE — 14, 16, 18

SUBSCRIBER REMOTE SERVICE PROVIDER 22

| | |
|---|---|
| INTERNET SERVICE PROVIDER 52 | DIGITAL RADIO SERVICE PROVIDER 58 |
| CELLULAR SERVICE PROVIDER 54 | AUDIO VIDEO PRODUCTION SOFTWARE PROVIDER 62 |
| AUDIO/VIDEO CONTENT STORAGE PROVIDER 56 | LIVE AUDIO/VIDEO BROADCAST SERVICE PROVIDER 64 |

FIG.2

VOICE/MANUAL ACTIVATED AND INTEGRATED AUDIO/VIDEO MULTI-MEDIA, MULTI-INTERFACE SYSTEM

BACKGROUND OF THE INVENTION

1. Field of the Invention

The present invention relates generally to the utilization of an enhanced form of audio and video content and the system and devices used to deliver and access it and, more specifically, to a system and devices to increase the number of access points a user/subscriber will have to request, play, record, and edit the enhanced multi-media and user generated audio/video content.

The enhanced form of audio and video content uses the integration of voice and manual activation technology in a unique way by embedding multiple questions and answers related to what is seen and or heard in each frame of that audio/video content. This kind of enhanced content can be incorporated into all multi-media and user generated audio/video content accessible through a subscriber service central base station and the devices that access it which include a base unit, a base unit's remote control, a portable unit, a light switch wall mounted universal remote, and a laptop/PC wherethrough a user will also be able to perform all functions and operations of each of these interface devices by the use of both voice activation and manual activation.

2. Description of the Prior Art

There are other audio/video devices designed for voice activation. While these audio/video devices may be suitable for the purposes for which they were designed, they would not be as suitable for the purposes of the present invention, as hereinafter described.

SUMMARY OF THE PRESENT INVENTION

The present invention is a system that incorporates the delivery of voice and manually activated and integrated audio/video content through various communication networks to multimedia interface devices that can access this kind of content as well as create this kind of content. The communication networks comprised in the present invention include an Internet based subscriber service serving as a cellular communications provider, an Internet Service Provider, a digital radio service provider, live audio/video broadcast service provider, audio/video production software provider as well as an audio/video content storage provider.

While voice recognition systems are known within the art, the present invention employs complementary redundant voice and manual function activation within the interface devices that are also interoperable thereby creating a network of devices with shared resources.

The present invention provides several new multimedia interface devices that can act as access points to a subscriber based central database and or station. The subscriber based central database and or station will provide the user of these new multimedia interface devices access to the voice and manual activated and integrated audio and or video content. The present invention provides several new multimedia interface devices from which a user will be able to initiate inquiries while listening to and or watching professional and or user generated multi-media voice and manually activated and integrated audio and or video content. These new multimedia interface devices will come in the form of a portable device, a base unit, base unit remote control, and a light switch wall mounted universal remote. All of which will have attached to it a finger print scanner as well as a camera, a flash, a microphone, a speaker, headphone jack, and touch screen video display. All of these new multimedia interface devices will also have memory card ports capable of using contemporary memory cards, memory cards with rechargeable batteries and memory cards with detachable rechargeable batteries. The use of a voice activated wireless headset/earpiece, a laptop/PC, stereo speakers and a TV screen can also be implemented in carrying out the functions of these new multimedia interface devices.

Each of these new multimedia interface devices will be capable of wireless connection and hardwire connection with each other and a subscriber central database and or station thereby enabling a subscriber to make a wireless phone call via Wi-Fi, Wi-Max, or cellular connection and be able to make a hardwire phone call via coaxial cable, fiber optic or PSTN connection. Each of the new multimedia interface devices can be registered under the same wireless account (via cellular or satellite) and hardwire account (via cable or PSTN). Each of these new multimedia interface devices can be sold or purchased separately. Each new multimedia interface devices will be able to sync with each other via Bluetooth. It is envisioned that each new multimedia interface device will have incorporated into it all of the most up-to-date wireless and hardwire connection technology. The types of wireless connection technology include, but are not limited to, cellular, Wi-Fi, Wi-Max, LTE, Bluetooth, wireless HDMI, and infrared. The types of hardwire connection technology include, but are not limited to, coaxial cable, USB, HDMI, audio/video, fiber optic and PTSN. It is envisioned that each new multimedia interface device will also have incorporated into it all of the most up-to-date video display technology, which can include but are not limited to, touch screen, high definition and 3D rendering. Each new multimedia interface device will also have an internal power supply via internal rechargeable battery.

As aforementioned, the present invention provides a base unit, a base unit remote control, a portable unit, a light switch wall mounted universal remote. All of which are voice command enabled to perform predetermined functions and may include the aforementioned manual activation controls for performing the same functions. Additionally provided is a re-chargeable power source that can be used to power memory storage devices and as supplemental power sources for the interface devices. The memory card with rechargeable battery will now become more advanced by having the rechargeable battery portion detachable from the memory card section. The detachable and rechargeable battery section can also be inserted into all memory card ports on all multimedia interface devices. The detachable and rechargeable battery portion will be able to both give and receive a charge to and from all memory card ports on all multimedia interface devices. As with the memory card with rechargeable battery from U.S. Pat. No. 6,941,181, the memory card with the detachable and rechargeable battery from this patent application will provide all portable multimedia interface devices with additional and supplemental energy to extend their use. It can also provide additional energy to the base unit device as well. All of the memory card ports on all of the multimedia interface devices will be able to operate a conventional memory card, a memory card with rechargeable battery, and a memory card with detachable and rechargeable battery. All memory card ports on all multimedia interface devices will be able to both give and receive a charge to and from the memory card with detachable and rechargeable battery.

The portable device, the base unit, the base unit remote control and the light switch wall mounted universal remote all have touch sensitive directional control keys that surround the touch screen of each of these devices. These touch sensitive directional control keys are also depressible. Meaning that a user can either touch the key to operate a function or actually depress that key to perform the same function. The reason or advantage to having this feature relates to the current use of touch screens. A user must "constantly" touch the screen to perform a function. This action leads to the touch screen becoming smeared or soiled by any residue on the fingers of a user. This residue can affect the clarity of anything visually being watched on the screen. The touch sensitive directional control keys that surround the touch screen allow a user to operate and perform more functions appearing on the touch screen without having to constantly touch the screen. This is not meant to eliminate the use of the touch screen but reduce the amount of times a user is required to touch it as well as reduce the amount of residue left on the screen from a user. The touch sensitive directional control keys that surround the touch screen will enable the user to scroll up, down, left, right, and diagonally in each corner of the screen. A user can expand and collapse a picture, image, or video viewable on the touch screen by touching, stroking, or depressing any combination of the touch sensitive direction control keys. This execution is meant to enhance the current available feature of using 2 or more fingers on the touch screen to expand or collapse an image. Again, the touch sensitive directional control keys reduce the amount of times a user is required to touch the screen thereby reducing the residue left on the screen. The touch sensitive directional control keys can also be used to execute functions when a user plays an interactive video game. These described functional uses of the touch sensitive directional control keys are but few of the many other roles they can serve to a user of each of the 4 devices (the portable device, the base unit, the base unit remote control and the light switch wall mounted the portable device universal remote) which have this feature. It is also envisioned, alternatively, that a continuous touch sensitive ring can also surround the edge of the touch screen of these same devices. The touch sensitive ring will function in a similar manner as the touch sensitive directional control keys. The touch sensitive ring can be depressible. The one differentiating factor between the touch sensitive ring and the touch sensitive directional control keys will be that the touch sensitive ring will not be broken into 8 or more individual keys. The touch sensitive ring will be a continuous ring.

The use of voice/manual activation technology will be further advanced through its integration into the audio/video content made available through CDs/DVDs, live digital broadcasts and downloadable files from the subscriber service central base station.

The present invention provides for the integration of voice and or manual commands used to interface with multimedia content to obtain information being requested by a user, of a specific multimedia interface device, that specifically, directly and or indirectly pertains to a person, place, thing, action or in fact anything being viewed and or heard from that particular multimedia content "during" its consumption by said user.

The present invention provides an enhanced use of voice and or manual commands as it relates to their integration with live and or recorded audio and or video content. What has been taught in the past is the method of using voice and or manual commands to search for audio and or video content on a portable device, a base unit device and a subscriber database. What is being taught as new in this patent application is that the use of voice and or manual commands will now enable a user, of a specific multimedia interface device, to interactively request and acquire information from a live and or recorded audio and or video content. The requested and acquired information can be specifically, directly and or indirectly related to a person, place or thing being viewed and or heard from said audio and or video content. An example of this application in use will refer to a user of a specific multimedia interface device listening to and or watching audio and or video content. The source of the audio and or video content can be from a live broadcast (including radio, cable or satellite), or recorded content from a CD/DVD or a website on the internet. The viewer of video content from a T.V show, a commercial, a movie, a sports game, or practically anything, may like a pair of jeans, a shirt, a watch, or anything that an actor or personality on the screen is wearing and would like to know the name brand of that item. With this new feature the viewer would simply say out loud, through the microphone of said multimedia interface device, "what is the name brand of the jeans person X is wearing?", "what is the location of this event?" etc. The viewer will then either be able to hear the answer to that request or question through the speaker of said multimedia interface device and/or view the answer to that request or question through the use of the touch screen display of said multimedia interface device or through a TV and speakers wirelessly and/or physically connected to said multimedia interface device. To optimize this feature the viewer will be able to request and acquire information on literally "everything" viewable in each frame of the video's content. Every frame of the video's content will have embedded, throughout its duration, references pertaining to "everything" the viewer can see and or think of while watching it. These references can be accessed by said viewer, at any point, as the video's content is being viewed. The request can also have a commercial and non commercial aspect to it. The viewer may be looking to purchase an item based on what is being seen. The viewer may also be looking to find out information based on what is being seen. The viewer will also be able to manually enter the same commands through the same multimedia interface device.

This new interactive feature is similar in execution for a listener of audio content from said specific multimedia interface device. Whereby, said listener will be able to request and acquire information pertaining to what is being heard from that audio's content. The listener of audio content from a radio show, a commercial, a sports game, etc, may have just caught the tail end of an advertisement for an upcoming concert for a musical artist or comedian coming to a nearby venue and did not hear the concert dates or locations. The listener would simply say out loud, through the microphone of said specific multimedia interface device, "what are the concert dates for musical artist "X" or comedian "Y"?" The listener can also ask "what are the locations for those concert dates?" The listener will then either be able to hear the answer to that request or question through the speaker of said multimedia interface device or view the answer to that request or question through the use of the touch screen display of said multimedia interface device or through a TV and speakers wirelessly and/or physically connected to said multimedia interface device. To optimize this feature the listener will be able to request and acquire information on literally "everything" heard throughout each frame of the audio's content. Every frame of the audio's content will have embedded, throughout its duration, references pertaining to "everything" the listener can hear and or think of while listening to it. These references can be accessed by said listener, at any point, as the audio's content is being heard. The request can also have a commercial and non commercial aspect to it. The listener may be looking to purchase a ticket for the concert based on what is heard. The listener may also be looking to find the address and directions to the location of that concert based on what is heard. The listener will also be able to manually enter the same commands through the same multimedia interface device.

This new feature of integrating voice and or manual commands to multiple references embedded to and accessible from each frame of an audio's and or video's content can be best implemented if it exists in the form of a programmable and updateable software program. To make this new feature actionable will require that any audio's and or video's content be edited with this software to carry and deliver a vast range of references that can be accessible to a listener and or viewer of that content. In particular, this new kind of software can be embedded into all forms of audio and or video content broadcasted live or recorded over the radio, cable TV, satellite TV, or the internet. The editing aspect of this software will enable it to be embedded to TV shows, movies, documentaries, commercials, sporting events, etc from previous years or current. This software can also be embedded to audio and or video content from websites and CDs/DVDs, further extending its use. By having this new feature exist as a software program enables it to be customize for use in just about any format where a listener and or viewer can interface with audio and or video content. This functionality provides the listener and or viewer of this particular kind of audio and or video content with a new dimension of enjoying its entertainment value. It gives the listener and or viewer of this particular kind of audio and or video content access to information they may be thinking about seeking while listening to and or viewing its content at the very moment they wish to inquire. The software program will be capable of performing a request sent from the user through both voice and manual commands. Because the software will be programmable and updateable the amount of references available to be embedded throughout each frame of any audio and or video content can grow over time.

It has been noted that the inquires, made by a listener and or viewer of this particular kind of audio and or video content, can have a commercial and non commercial aspect to it. These two aspects add an endearing component to the content being heard and or viewed by the user of a specific multimedia interface device. The commercial aspect enables a user to seek out and purchase something as a result of that particular inquiry. It is envisioned that the user of a specific multimedia interface device will be able to make a commercial inquiry, conduct a search, and complete a transaction all on the same device and all at the same time. This multi-tasking feat will be accomplishment through the use of multiple screens that will appear in a format similar to picture-in-picture. The user can listen to the audio and or view the video content on one screen, conduct a search via the internet from another screen and finally complete a transaction via a website from the same screen or yet another screen. The user will be able to switch back and forth from one screen to another. As with all actions; the inquiry, the search, and completing a transaction and switching screens can always be implemented through the use of both voice and or manual commands. The non commercial aspect enables a user to seek out knowledge about a particular person, place, thing or action as a result of that particular inquiry. It is envisioned that the user of a specific multimedia device will be able to make a non commercial inquiry and conduct a search in the same manner described for a commercial inquiry. This multi-tasking feat will be accomplishment through the use of multiple screens that will appear in a format similar to picture-in-picture. The user can listen to the audio and or view the video content on one screen and conduct a search via the internet from another screen. The user will be able to switch back and forth from one screen to another. As with all actions; the inquiry, the search and switching screens can always be implemented through the use of both voice and or manual commands.

All of the features described in the previous paragraphs from the integration of voice and or manual commands to multiple references embedded to and accessible from each frame of an audio's and or video's content, to initiating an inquiry, to conducting a search and or completing a transaction, will all function similarly when the source of the audio and or video content is user generated. The user of a specific multimedia device will also be able to create their own audio and or video content via the microphone, the video camera, and available software programs and applications accessible on said device or subscriber database. The creator of user generated audio and or video content will have access to editing software for that content, which will be similar to the editing software used to create the professional audio and or video content generated by studios and or networks. This editing software will enable that content's creator to embed each frame of the user generated audio and or video content with references that can be accessed through a specific multimedia interface device. Each frame of the user generated audio content can have embedded, throughout its duration, references pertaining to "everything" the listener can hear and or think of while listening to it. Each frame of the user generated video content can have embedded, throughout its duration, references pertaining to "everything" the viewer can see and or think of while watching it. These references can be accessed by said listener and or viewer through the use of voice and or manual commands, at any point, as the audio's content is being heard and or as the video's content is being watched from a specific multimedia interface device. Because the editing software will be programmable and updateable the amount of references available to be embedded to the user generated audio and or video content can grow over time.

The creator of that user generate audio/video content will be able to add these features during the editing of that content. The creation and editing of user generate audio/video will be initiated through all interface devices. The user generated audio/video content can be stored on all internal storage mediums of all interface devices, all memory cards including the memory card with detachable rechargeable battery, as well as the user's/subscriber's account at the central base station.

An example of this feature can be depicted using the digital camera and microphone on the portable unit to make a video recording. Let's say in this example that the creator of the user generated video content made a film on his/her travel to the Caribbean. That person will be able to edit that video content to include embedded voice/manually activated command files that will store questions and their answers pertaining to elements seen and/or heard throughout the film. Elements such as the names of the places you visited, the names of the people appearing throughout the film, the kind of music played in the background of your film, etc., can be asked during or at the end of play. The viewer of that user generated video content will be able to ask such things as: "Who is that standing next to you?", "What is the name of the town you are in?", "What is the name of that song playing in the background?" etc. To which the answers to the viewer's questions will be instantly given both audibly and/or visually via the TV/monitors, touch screens and/or speakers physically or wirelessly connected to all multimedia interface devices. Also, the answers to the viewer's questions can be given after the end of play. The viewer will be able to select whether they want the answers to their questions given instantly or at the end of play. The viewer will also be able to see and/or hear a list of all questions available to be asked as well as the answers to these questions via the TV/monitors, touch screens and/or speakers physically or wirelessly connected to all interface devices. The viewer will be able to accomplish these tasks through the use of voice and manual activation available on all multimedia interface devices (base unit, portable unit, remote control for the base unit, and the light switch/wall mounted universal remote).

Another example of this feature can be depicted using the microphone on all interface devices as well as any derivative applications to make an audio recording of someone singing acappella and/or accompanied by music. This audio recording can be later on edited by embedding it with voice/manually activated command files that will store questions and their answers pertaining to elements heard on that audio content.

The listener of that user generated audio content will be able to ask, during or at the end of play, such things as: "When did you make this track?", "What kind of equipment or applications did you use to make this track?", "What are the lyrics to the song you are singing?", etc. To which the answers to the listener's questions will be instantly given both audibly and/or visually via the TV/monitors, touch screens and/or speakers physically or wirelessly connected to all interface devices. Also, the answers to the listener's questions can be given after the end of play. The listener will be able to select whether he/she wants the answers to their questions given instantly or at the end of play. The listener will also be able to see and/or hear a list of all questions available to be asked as well as the answers to these questions via the TV/monitors, touch screens and/or speakers physically or wirelessly connected to all interface devices. The listener will be able to accomplish these tasks through the use of voice and manual activation available on all multimedia interface devices (base unit, portable unit, remote control for the base unit, and the light switch/wall mounted universal remote).

All of the features described in the previous paragraphs from the integration of voice and or manual commands to multiple references embedded to and accessible from each frame of an audio's and or video's content, to initiating an inquiry, to conducting a search, will all function similarly when the source of the audio and or video content is an interactive video game. An example of this feature in use can be described from the perspective of a user playing a first person game like "Halo", in addition to the user's physical input through the control keys and buttons of the base unit's remote control, the portable unit, and light switch wall mounted universal remote "during" live play of the game the user will also be able to use voice activation through each of these devices, as well as a voice activated wireless headset/earpiece, to "supplement" the "live" play of the game whether it be to; start, pause and/or stop the game, change weapons or vehicles, change viewing angle, change character, change level, verbally interacting with a character in the game, etc. The user/game player can make inquiries about everything viewable in each frame of the interactive video games' content. Examples of the kind of inquiries that can be made include: "What are the capabilities of character "X"?, What kind of amulet, weapon or clothing is character X wearing?, What are my best options for completing this level?, Who designed this character?, Who designed this level?, and much more. The answer to these inquiries can be given by a visual response, an audible response or executable action by one or more characters, vehicles or accessories in the interactive video game. The embedded and interactive voice and manual commands are meant to function similarly whether the audio/video content deals with reality or virtual reality. Each frame of the interactive video game can have embedded, throughout its duration, references pertaining to "everything" the user/game player can see, hear and or think of while playing the game. These references can be accessed by said user/game player through the use of voice and or manual commands, at any point, as the interactive video game's content is being played from a specific multimedia interface device. Because the editing software embedded to the interactive video game will be programmable and updateable the amount of references available to be embedded to the interactive video game content can grow over time.

Another new feature of this patent is the unique use of a digital finger print scanner which will be integrated onto each new multimedia interface device. The digital finger print scanner will provide several capabilities. The first capability will serve as a means of locking and unlocking access to each device. The second capability will serve as a secure means to complete financial transactions. The final capability will enable a separate registered subscriber to remotely access their lost or forgotten multimedia interface device by using another registered subscriber's multimedia interface device. This final capability may require that both users have an account at the same communication network subscription provider. To safely carry out this feature it is envisioned that when the subscriber of a lost or forgotten multimedia interface device scans his/her fingerprint on the finger print scanner of another registered subscriber's multimedia interface device (as the donor device) they will be able to remotely access their lost or forgotten multimedia interface device. It is also envisioned that through remote access the subscriber of the lost or forgotten multimedia interface device will be able to either access all of the content as it would appear on that device when using the "donor" multimedia interface device or access the lost or forgotten multimedia interface device directly.

A primary object of the present invention is to provide a system that incorporates the delivery of voice and manually activated and integrated audio/video content through various communication networks to multimedia interface devices that can access this kind of content as well as create this kind of content. The communication networks comprised in the present invention include an Internet based subscriber service serving as a cellular communications provider, an Internet Service Provider, a digital radio service provider, live audio/video broadcast service provider, audio/video production software provider and an audio/video content storage provider.

Another object of the present invention is to provide a plurality of user interface interoperable devices for accessing the aforementioned services and the production of audio/video content.

Yet another object of the present invention is to provide a plurality of interoperable interface devices incorporating means for voice activation of provided functions and means for manually executing the functions of the devices.

Still yet another object of the present invention is to provide application software for the creating, playing and editing original and derivative multi-media works.

Additional objects of the present invention will appear as the description proceeds.

The present invention overcomes the shortcomings of the prior art by providing an enhanced form of edited interactive audio and video content delivered through a subscriber based network system and accessed by several unique multimedia interface devices. These unique multimedia interface devices can also create and edit both user generated audio and video content into this enhanced form of edited interactive audio and video content. The present invention will incorporate both voice and manual activation as an embedded technology into all multi-media and user generated audio/video content. The present invention will enable a user to inquire and access more information about what is seen and or heard on any audio and video content than what that content in its present form currently provides. The present invention will enable a user to execute these inquires through a base unit, a base unit's remote control, a portable unit, a light switch mounted universal remote.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 2 is a chart of the system of the present invention.

DESCRIPTION OF THE REFERENCED NUMERALS

Figure 1:
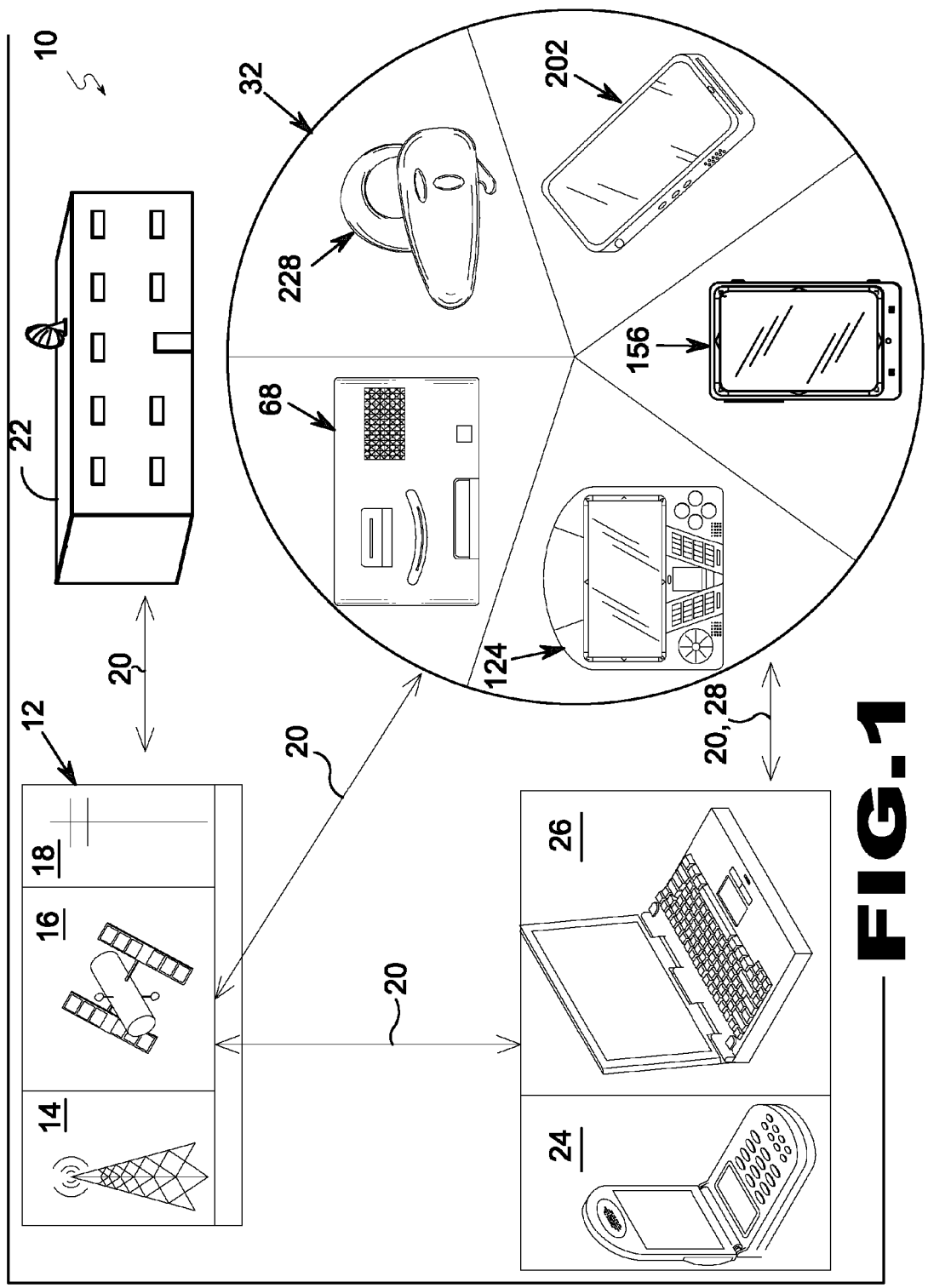
FIG. 1 is an illustrative view of the system of the present invention.

Turning now descriptively to the drawings, in which similar reference characters denote similar elements throughout the several views, the figures illustrate the Voice/Manual Activated and Integrated Audio/Video Multi-Media, Multi-Interface System of the present invention. With regard to the reference numerals used, the following numbering is used throughout the various drawing figures.

10 Voice/Manual Activated and Integrated Audio/Video Multi-Media, Multi-Interface System of the present invention
12 communication medium
14 cellular
16 satellite
18 land lines
20 signal
22 remote service provider
24 cell phone
26 computer
28 cable
32 devices
34 chart
36 devices
38 microphone
40 speaker
42 microprocessor
44 storage medium
46 memory
48 communication circuit
50 voice and manual activated task software
52 Internet Service Provider
54 cellular service provider
56 subscriber database
58 audio service provider
62 video service provider
64 audio/video service provider
66 chart
68 base unit
70 touch screen video display of 68
72 memory card ports of 68
74 USB ports of 68
76 microphone jack of 68
78 microphone of 68
80 scroll keys of 68
82 infrared sensor of 68
84 power on/off of 68
86 CD/DVD of 68
88 control keys of 68
92 power cable of 68
94 power outlet of 68
96 coax cable connections of 68
98 audio/video in and out connections of 68
100 Ethernet ports of 68
102 HDMI connector of 68
104 S-video Connector of 68
106 DVI connector of 68
108 cavity of 68
110 cradle for remote control 124
112 connector receptacle for 124
114 cradle for portable unit 156
116 connector receptacle for 156
118 speaker of 68
122 fingerprint scanner of 68
124 base unit remote control
126 touch screen display of 124
128 scroll keys of 124
130 multi-directional key pad of 124
132 speaker of 124
134 microphone of 124
136 fingerprint scanner of 124

138 key pad of 124
140 control buttons of 124
142 control keys of 124
144 memory card slot of 124
146 infrared sensor of 124
148 USB port of 124
152 finger grips of 124
154 connector to base unit 68
156 portable unit
158 touch screen display of 156
160 8-way directional scroll keys of 156
162 speakers of 156
164 microphone of 156
166 up/down scroll keys of 156
168 headphone jack of 156
170 infrared sensor of 156
172 memory card port of 156
174 USB port of 156
176 connector to base unit 68
178 multi-directional keypads of 156
182 fingerprint scanner of 156
184 camera of 156
186 camera lens of 156
188 camera flash of 156
190 light switch
192 release button for 202
194 microphone of 190
196 speaker of 190
198 light switch on/off of 190
200 voice control on/off of 190
202 universal remote
204 display of 202
206 headphone jack of 202
208 control keys of 202
212 speaker of 202
214 microphone of 202
216 connector to light switch 190
218 scroll keys of 202
220 infrared sensor of 202
222 power on/off of 202
224 fingerprint scanner of 202
226 memory card slot of 202
228 wireless headset earpiece
230 mode button of 228
232 answer button of 228
234 microphone of 228
236 storage device with detachable rechargeable battery portion
238 storage device of 236
242 device connector of 238
244 rechargeable battery of 236
246 receptacle of 244
248 battery connector of 238

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the system of the present invention. Illustrated is the present invention 10 comprising an Internet based subscriber service 22 serving as a cellular communications provider, an Internet Service Provider, a digital radio service provider, live audio/video broadcast service provider, audio/video production software provider as well as an audio/video content storage provider for users through available communications technology 12 including cell towers 14, satellites communications 16, and land lines 18 via transmission 20 by providing a plurality of user interface interoperable devices 32 comprising a base unit 68, base unit remote control 124, portable unit 156, and light switch wall mounted universal remote 202 and wireless headset earpiece 228 that are used in conjunction with user provided mobile device 24 and computer device 26 for accessing the aforementioned services and the production of audio/video content.

Referring to FIG. 2, shown is a chart of the system of the present invention. Depicted is chart 34 of the present invention comprising an Internet based subscriber service 22 comprising a cellular communications provider 54, an Internet Service Provider 52, a digital radio service provider 58, live audio/video broadcast service provider 64, audio/video production software provider 62 and an audio/video content storage provider 56 for users through available communications technology including cell towers 14, satellites communications 16, and land lines 18 via transmission 20,28, providing a plurality of interoperable interface devices 36 comprising a base unit, base unit remote control, portable unit, and light switch wall mounted universal remote and wireless headset earpiece where each device incorporates a touch screen video display, a microphone 38, speaker 40, microprocessor 42, storage medium 44, memory 46, comm. circuit 48 and downloadable voice and manual activated task software 50

Figure 3:
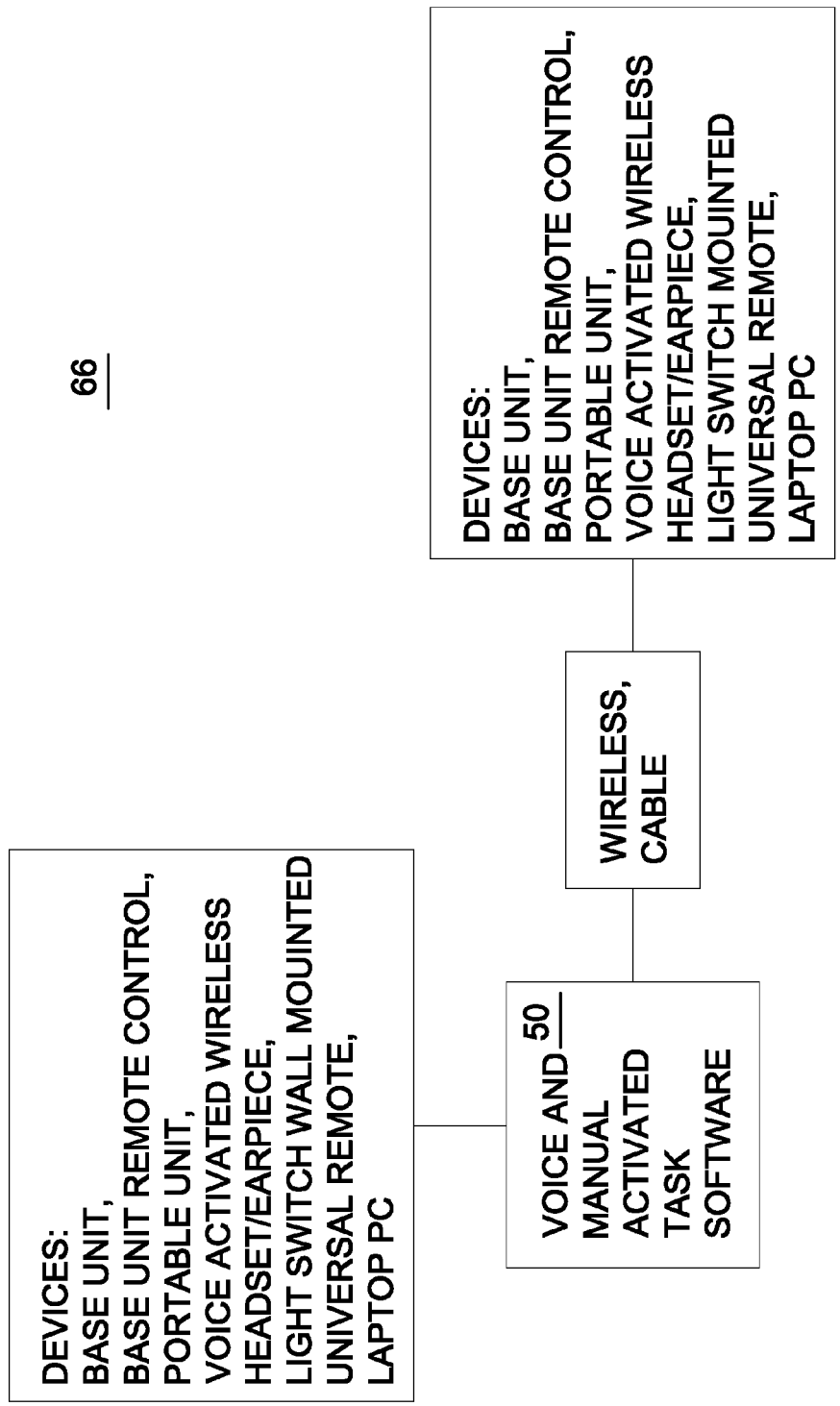
FIG. 3 is a chart depicting the interoperability of the interface devices.

Referring to FIG. 3, shown is a chart 66 depicting the interoperability of the interface devices. The present invention provides a plurality of interoperable interface devices that are both voice activated and manually activated while also incorporating voice and manual activated task software 50 whereby the interface devices are interoperable through wireless communication or wired communication.

Figure 4:
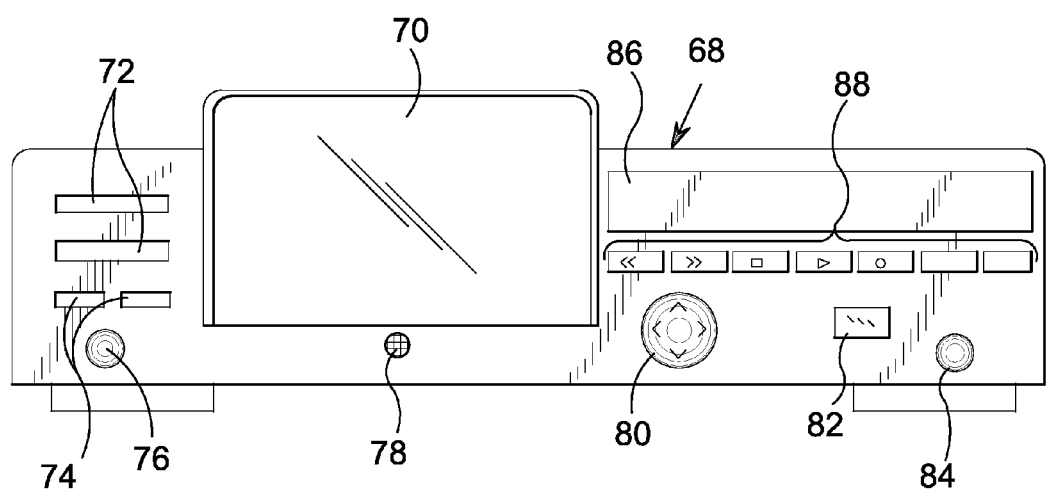
FIGS. 4 through 6 depict the base unit of the present invention.
Figure 5:
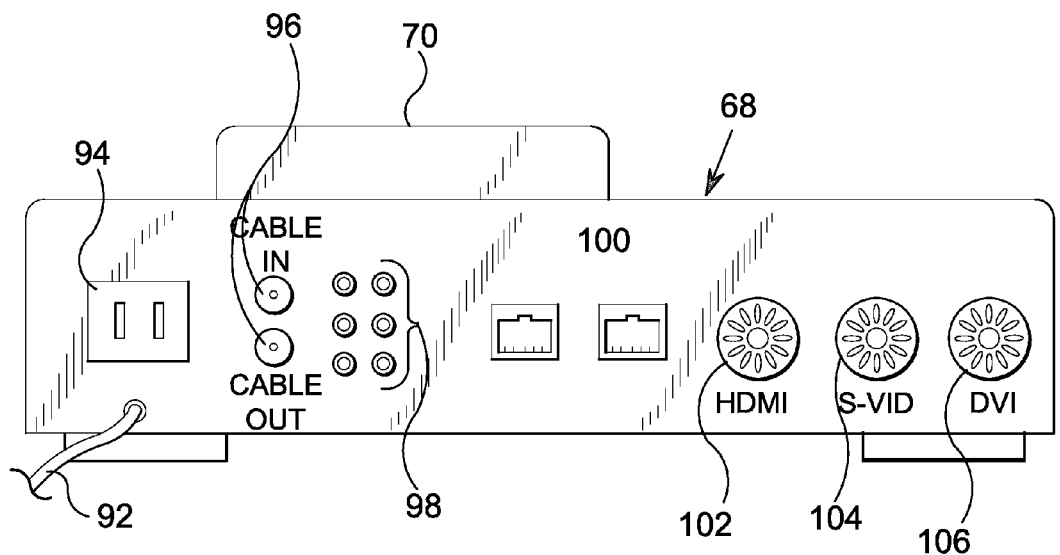
Figure 6:
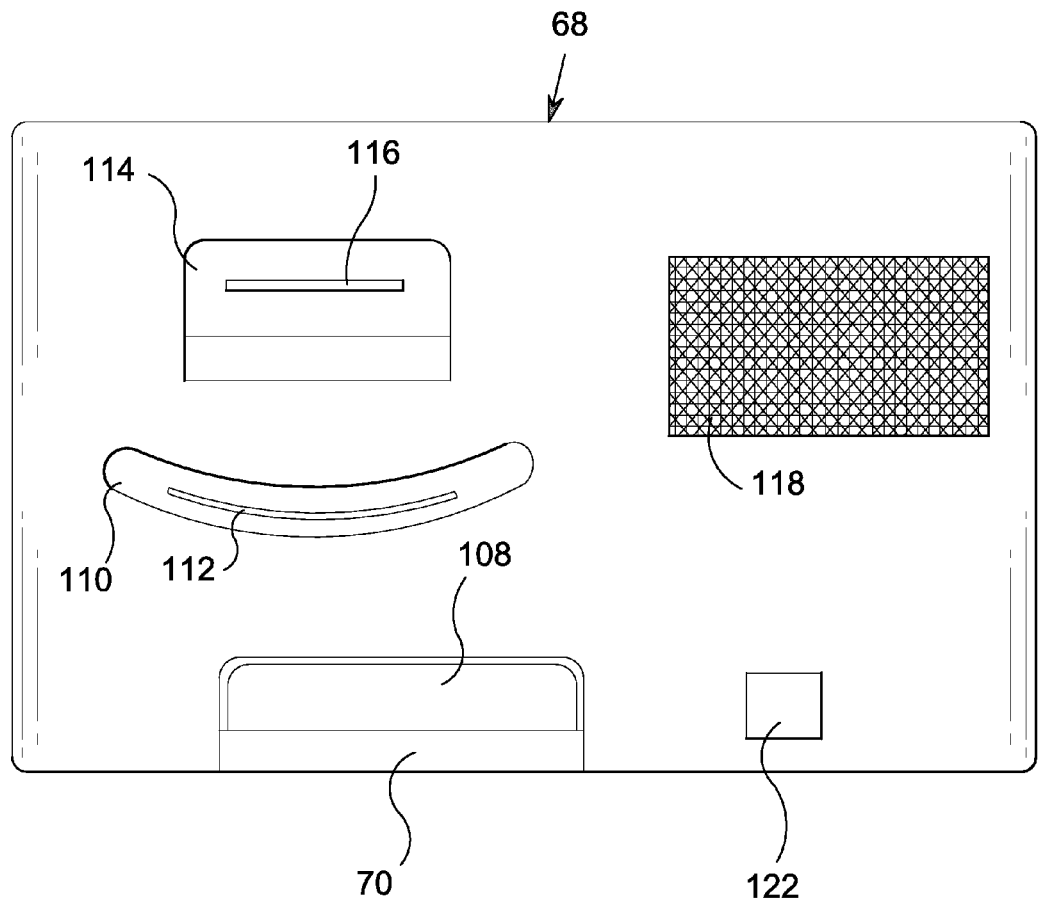

Referring to FIGS. 4 through 6, shown is the base unit of the present invention. The base unit housing 68 serves as the main interface device for mounting user provided peripherals and media. The base unit incorporates touch screen video display 70 that is rotatable backwards, DVD player 86, control keys 88, scroll keys 80 and infrared sensor 82 for operating the various incorporated peripherals and user provided peripheral using various connector receptacles including microphone jack 76, USB ports 74, memory card ports 72, coax cable connector 96, audio/video in out connectors 98, Ethernet connectors 100, HDMI connector 102, S-video connector 104 and DVI connector 106. Also provided are docking station 110 having connector receptacle 112 for receiving base unit remote control 124 and docking station 114 having receptacle 116 for receiving portable unit 156. The base unit housing further provides power connector 92, on/off switch 84 and auxiliary power source 94 while the fingerprint scanner 122 provide for securing the device from unauthorized users. Microphone 78 and speaker 118 serve as the default audio input and output when additional audio equipment is not provided by the user.

Figure 7:
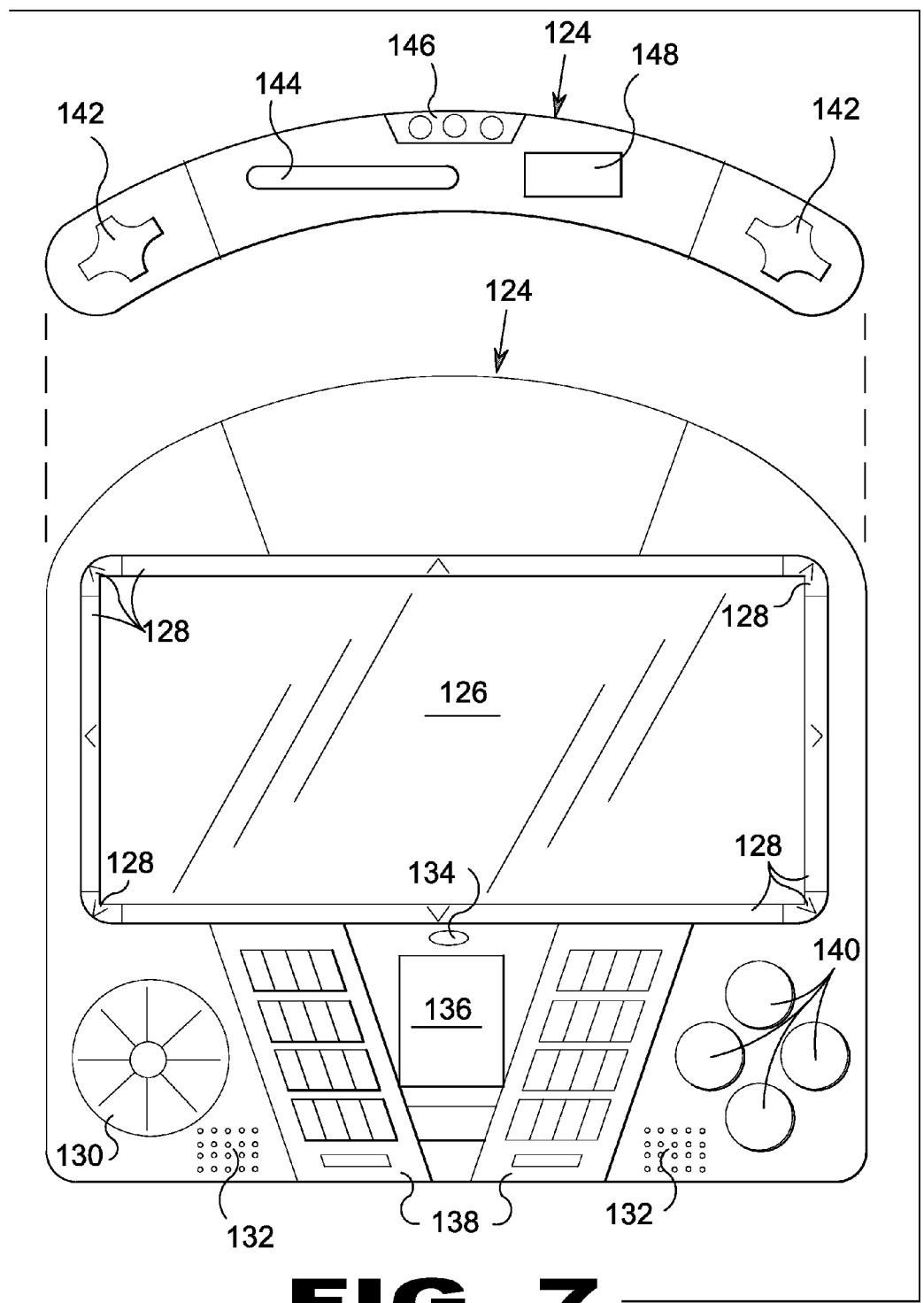
FIGS. 7 and 8 illustrate the base unit remote control of the present invention.
Figure 8:
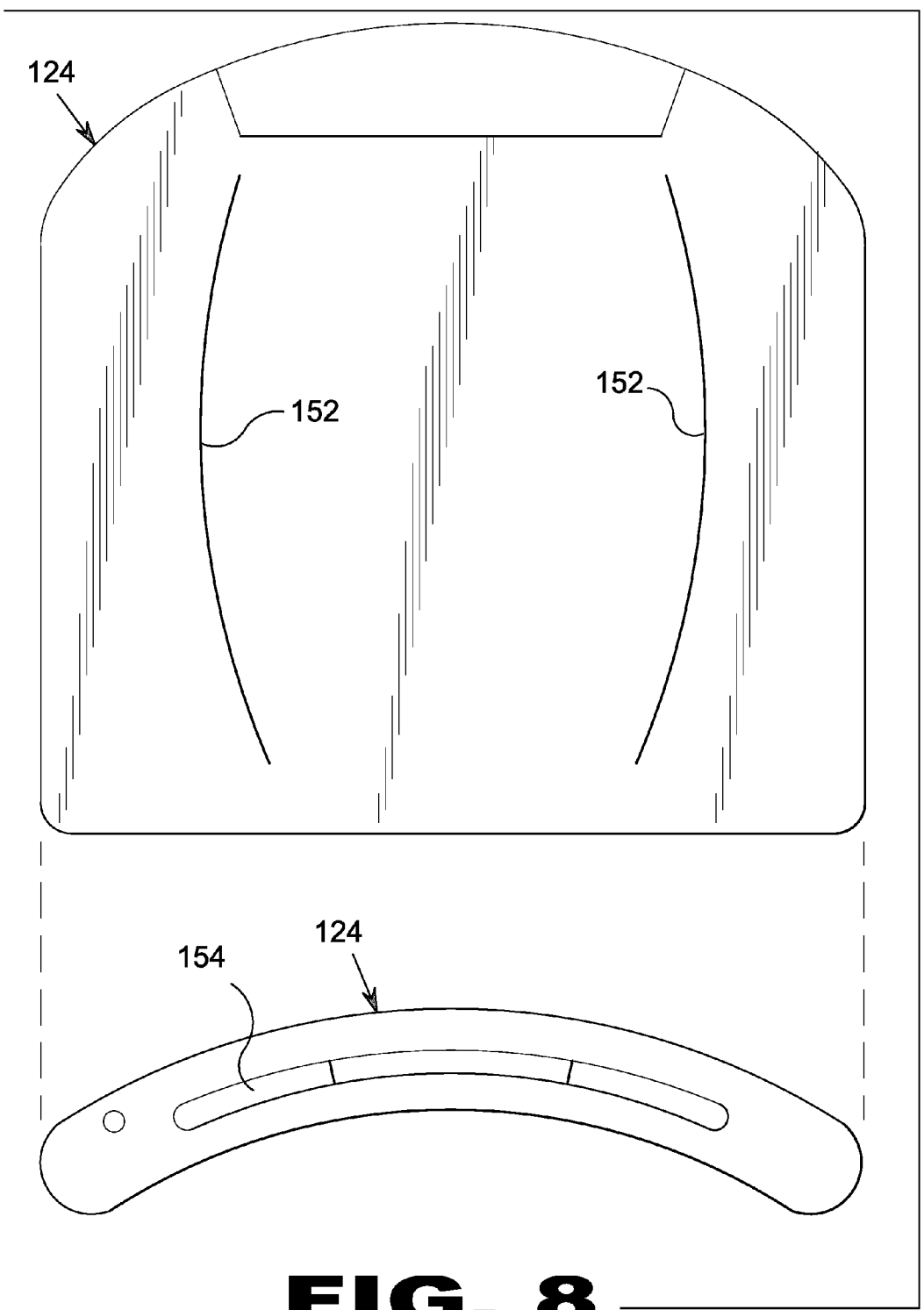

Referring to FIGS. 7 and 8, shown is the base unit remote control. The base unit remote control 124 mounts to base unit 68 by connector 154 and has finger grips 152 for ease of handling. Remote control 124 also provides touch screen display 126 for imitating tasks displayed on the touch screen 126. Further provided are scroll keys 128 that can be used to control cursor movement on the display and multi-directional key pad 130, control buttons 140, control keys 142 and QWERTY style keyboard 138. Speaker 132 and microphone 134 provide for audio command input and audio response output of audio commands and responses. Memory card slot 144 provides for additional content and for storing and retrieving content from the remotes internal storage along with USB port 148 for interfacing to other devices. Infrared sensor 146 can be used to control other devices while the fingerprint scanner 136 provide for securing the device from unauthorized users.

Figure 9:
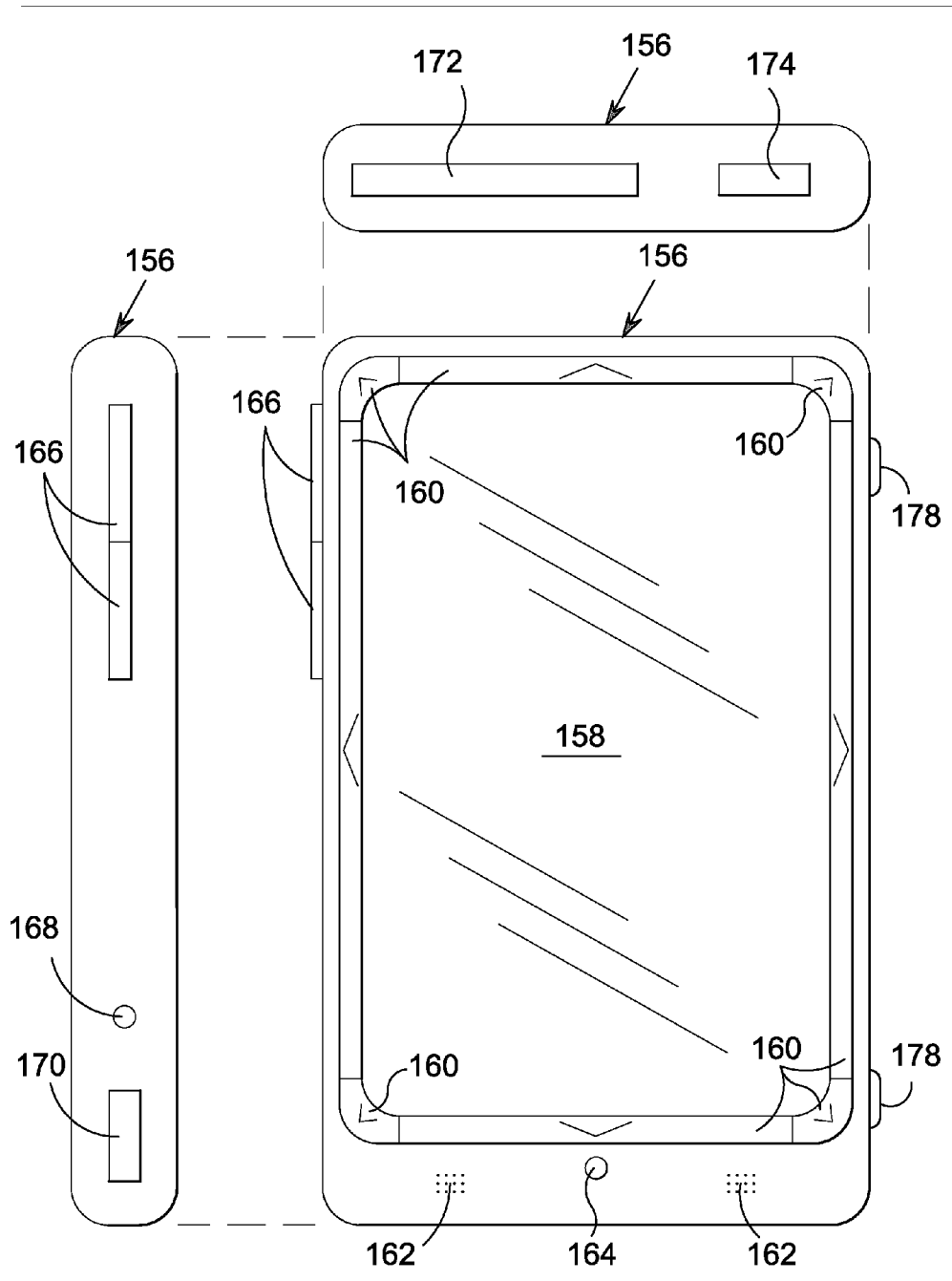
FIGS. 9 and 10 illustrate the portable unit of the present invention.
Figure 10:
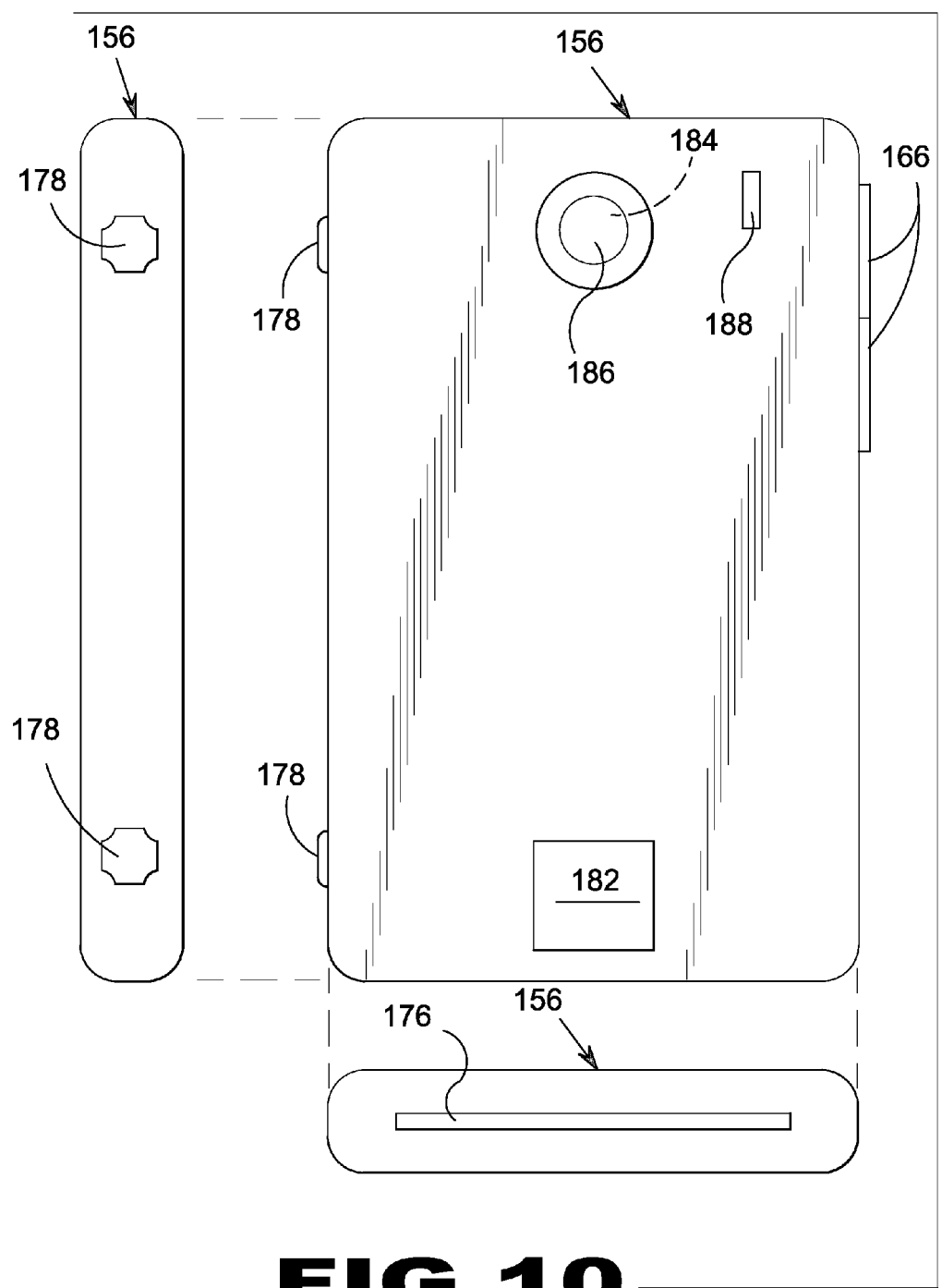

Referring to FIGS. 9 and 10, shown is the portable unit of the present invention. The user will be able to perform all functions through and operations of the portable unit 156 by the use of both voice activation and manual activation including all functions of the HD digital video camera 184 through both verbal and manual command signals.

The manual commands will come through the use of the touch screen video display 158 scroll keys 160, and control keys 166. The verbal commands will come through the use of the microphone 164. Both manual and verbal commands would control such functions as: zooming in and out 186, adjusting for lighting 188, setting a timer delay, the act of taking a still photo, the starting and ending of video filming, the editing of video content (such as removing red eye, blurring, etc), the emailing and wirelessly transmitting of the video content, etc.

The downloadable software program accessed from the central base station provides for user generated audio/video content to become embedded with voice/manual command files that store questions and their answers pertaining to all elements seen and/or heard in every frame of the user generated audio/video content. This same downloadable software program can also be used to enhance live and or taped professionally generated audio/video content to become embedded with voice/manual command files that store questions and their answers pertaining to all elements seen and/or heard in every frame of the live and or taped professionally generated content.

The viewer/listener will be able to access this feature during and at the end of watching and/or listening to the user generated audio/video content. The viewer/listener will use the voice/manual activation technology made available through all interface devices (the base unit, the base unit's remote control, the portable unit and the light switch wall mounted universal remote) to verbally and/or tactilely ask questions to acquire any information they seek to obtain pertaining to all elements seen and/or heard on the user generated audio/video content.

The creator of the user generate audio/video content will be able to add these features during the editing of the content. The creation and editing of user generate audio/video will be initiated through all interface devices. The user generated audio/video content can be stored on all internal storage mediums of all interface devices, all memory cards including the memory card with detachable rechargeable battery, as well as the user's/subscriber's account at the central base station.

An example of this feature will come by way of the user/subscriber using the digital camera 184 and microphone 164 on the portable unit 156 to make an audio/video recording. Let's say in this example that the creator of the user generated audio/video content made a film on his/her travel to the Caribbean. That person will be able to edit that video content to include embedded voice/manually activated command files that will store questions and their answers pertaining to elements seen and/or heard throughout the film. Elements such as the names of the places you visited, the names of the people appearing throughout the film, the kind of music played in the background of your film, etc., can be asked during or at the end of play. The viewer of that user generated video content will be able to ask such things as: "Who is that standing next to you?", "What is the name of the town you are in?", "What is the name of that song playing in the background?" etc. To which the answers to the viewer's questions will be instantly given both audibly and/or visually via the TV/monitors, touch screens and/or speakers physically or wirelessly connected to all interface devices. Also, the answers to the viewer's questions can be given after the end of play. The viewer will be able to select whether they want the answers to their questions given instantly or at the end of play. The viewer will also be able to see and/or hear a list of all questions available to be asked as well as the answers to these questions via the TV/monitors, touch screens and/or speakers physically or wirelessly connected to all interface devices.

Another example of this feature can be depicted using the microphone on all interface devices as well as any derivative applications to make an audio recording of someone singing acappella and/or accompanied by music. This audio recording can be later on edited by embedding it with voice/manually activated command files that will store questions and their answers pertaining to elements heard on that audio content.

The listener of that user generated audio content will be able to ask, during or at the end of play, such things as: "When did you make this track?", "What kind of applications did you use to make this track?", "What are the lyrics to the song you are singing?", etc. To which the answers to the listener's questions will be instantly given both audibly and/or visually via the TV/monitors, touch screens and/or speakers physically or wirelessly connected to all interface devices. Also, the answers to the listener's questions can be given after the end of play. The listener will be able to select whether he/she wants the answers to their questions given instantly or at the end of play. The listener will also be able to see and/or hear a list of all questions available to be asked as well as the answers to these questions via the TV/monitors, touch screens and/or speakers physically or wirelessly connected to all interface devices. The viewer/listener will be able to accomplish these tasks through the use of voice and manual activation technology available on all multimedia interface devices (base unit, portable unit, remote control for the base unit, and the light switch/wall mounted universal remote).

The downloadable software program used in editing user generated audio/video content will also carry audible/manual commands to access commercial and non-commercial references embedded onto voice/manually activated and integrated audio/video content. The commercial references, which can pertain to the brand name of something seen and or heard in that audio/video content, may lead the viewer/listener to seek out to purchase an item based on that reference. The non-commercial references, which can pertain to the name of a person, place or thing seen and or heard in that audio/video content, may lead the viewer/listener to seek out more information based on that reference.

This same downloadable software program used in editing user generated audio/video content will also carry voice/manual activation technology to search the Internet via a PIP (Picture-in-Picture) access window or an "audible only" interface that can be utilized during live play of that user generated audio/video content. The addition of having a PIP access window to search the Internet as a part of this software program will enable the viewer/listener of that user generated audio/video content to have immediate access to initiate a search to obtain information or make a purchase from a website based on elements seen and/or heard on that user generated audio/video content.

Also, the "audible only" interface allows for a search of the Internet without having to look at the video display. The "audible only" interface is crafted for people on the go who do not have time to look at the video display of their interface device. The "audible only" interface allows for the audible feedback of the information sought after by the viewer/listener. The viewer/listener will be able to accomplish these tasks through the use of all interface devices (base unit, portable unit, remote control for the base unit and the light switch/wall mounted universal remote).

The voice/manually activated and integrated audio/video content will also operate in the same manner for professionally generated audio/video content as it does for the user generated audio/video content. Professionally generated audio/video content can have embedded, throughout its duration, voice/manual command files that store questions and their answers pertaining to all elements seen and/or heard in every frame of the audio/video content. The source of the professionally generated audio/video content can be from a live broadcast (including radio, cable or satellite), or recorded content from a CD/DVD or a website on the internet. The viewer of video content from a T.V show, a commercial, a movie, a sports game, or practically anything, may like a pair of jeans, a shirt, a watch, or anything that an actor or personality on the screen is wearing and would like to know the name brand of that item. With this new feature the viewer would simply say out loud, through the microphone of any of the multimedia interface devices (base unit, base unit remote control, portable unit, and light switch wall mounted universal remote), "what is the name brand of the jeans person X is wearing?", "what hair products does person Y use?", or "where is this show/event being filmed?" etc. To which the answers to the viewer's questions or request will be instantly given both audibly and/or visually via the touch screens, TV/monitors, and/or speakers physically or wirelessly connected to all interface devices. To optimize this feature the viewer will be able to request and acquire information on literally "everything" viewable in each frame of the video's content. Every frame of the video's content will have embedded, throughout its duration, references pertaining to "everything" the viewer can see and or think of while watching it. These references can be accessed by said viewer, at any point, as the video's content is being viewed. The request can also have a commercial and non commercial aspect to it. The viewer may be looking to purchase an item based on what is being seen. The viewer may also be looking to find out information based on what is being seen. The viewer will also be able to manually enter the same commands through all multimedia interface devices.

This new interactive feature is similar in execution for a listener of audio content from said specific multimedia interface device. Whereby, said listener will be able to request and acquire information pertaining to what is being heard from that audio's content. The listener of audio content from a radio show, a commercial, a sports game, etc, may have just caught the tail end of an advertisement for an upcoming concert for a musical artist or comedian coming to a nearby venue and did not hear the concert dates or locations. The listener would simply say out loud, through the microphone of any of the multimedia interface devices (base unit, base unit remote control, portable unit, and light switch wall mounted universal remote), "what are the concert dates for musical artist "X" or comedian "Y" performances?", "what other acts are performing with musical artist "X" or comedian "Y"?" The listener can also ask "what are the locations for those concert dates?" or "how can I get tickets to see this show or performance?" To which the answers to the listener's questions or request will be instantly given both audibly and/or visually via the touch screens, TV/monitors, and/or speakers physically or wirelessly connected to all interface devices. To optimize this feature the listener will be able to request and acquire information on literally "everything" heard throughout each frame of the audio's content. Every frame of the audio's content will have embedded, throughout its duration, references pertaining to "everything" the listener can hear and or think of while listening to it. These references can be accessed by said listener, at any point, as the audio's content is being heard. The request can also have a commercial and non commercial aspect to it. The listener may be looking to purchase a ticket for the concert based on what is heard. The listener may also be looking to find the address and directions to the location of that concert based on what is heard. The listener will also be able to manually enter the same commands through all multimedia interface devices.

This new feature of integrating voice and or manual commands to multiple references embedded to and accessible from each frame of an audio's and or video's content can be best implemented if it exists in the form of a programmable and updateable software program. To make this new feature actionable will require that any audio's and or video's content be edited with this software to carry and deliver a vast range of references that can be accessible to a listener and or viewer of that content. In particular, this new kind of software can be embedded into all forms of audio and or video content broadcasted live or recorded over the radio, cable TV, satellite TV, or the internet. The editing aspect of this software will enable it to be embedded to TV shows, movies, documentaries, commercials, sporting events, etc from previous years or current. This software can also be embedded to audio and or video content from websites and CDs/DVDs, further extending its use. By having this new feature exist as a software program enables it to be customize for use in just about any format where a listener and or viewer can interface with audio and or video content. This functionality provides the listener and or viewer of this particular kind of audio and or video content with a new dimension of enjoying its entertainment value. It gives the listener and or viewer of this particular kind of audio and or video content access to information they may be thinking about seeking while listening to and or viewing its content at the very moment they wish to inquire. The software program will be capable of performing a request sent from the user through both voice and manual commands. Because the software will be programmable and updateable the amount of references available to be embedded throughout each frame of any audio and or video content can grow over time.

It has been noted that the inquires, made by a listener and or viewer of this particular kind of audio and or video content, can have a commercial and non commercial aspect to it. These two aspects add an endearing component to the content being heard and or viewed by the user of a specific multimedia interface device. The commercial aspect enables a user to seek out and purchase something as a result of that particular inquiry. It is envisioned that the user of a specific multimedia interface device will be able to make a commercial inquiry, conduct a search, and complete a transaction all on the same device and all at the same time. This multi-tasking feat will be accomplishment through the use of multiple screens that will appear in a format similar to picture-in-picture. The user can listen to the audio and or view the video content on one screen, conduct a search via the internet from another screen and finally complete a transaction via a website from the same screen or yet another screen. The user will be able to switch back and forth from one screen to another. As with all actions; the inquiry, the search, and completing a transaction and switching screens can always be implemented through the use of both voice and or manual commands. The non commercial aspect enables a user to seek out knowledge about a particular person, place, thing or action as a result of that particular inquiry. It is envisioned that the user of a specific multimedia device will be able to make a non commercial inquiry and conduct a search in the same manner described for a commercial inquiry. This multi-tasking feat will be accomplishment through the use of multiple screens that will appear in a format similar to picture-in-picture. The user can listen to the audio and or view the video content on one screen and conduct a search via the internet from another screen. The user will be able to switch back and forth from one screen to another. As with all actions; the inquiry, the search and switching screens can always be implemented through the use of both voice and or manual commands.

Figure 11:
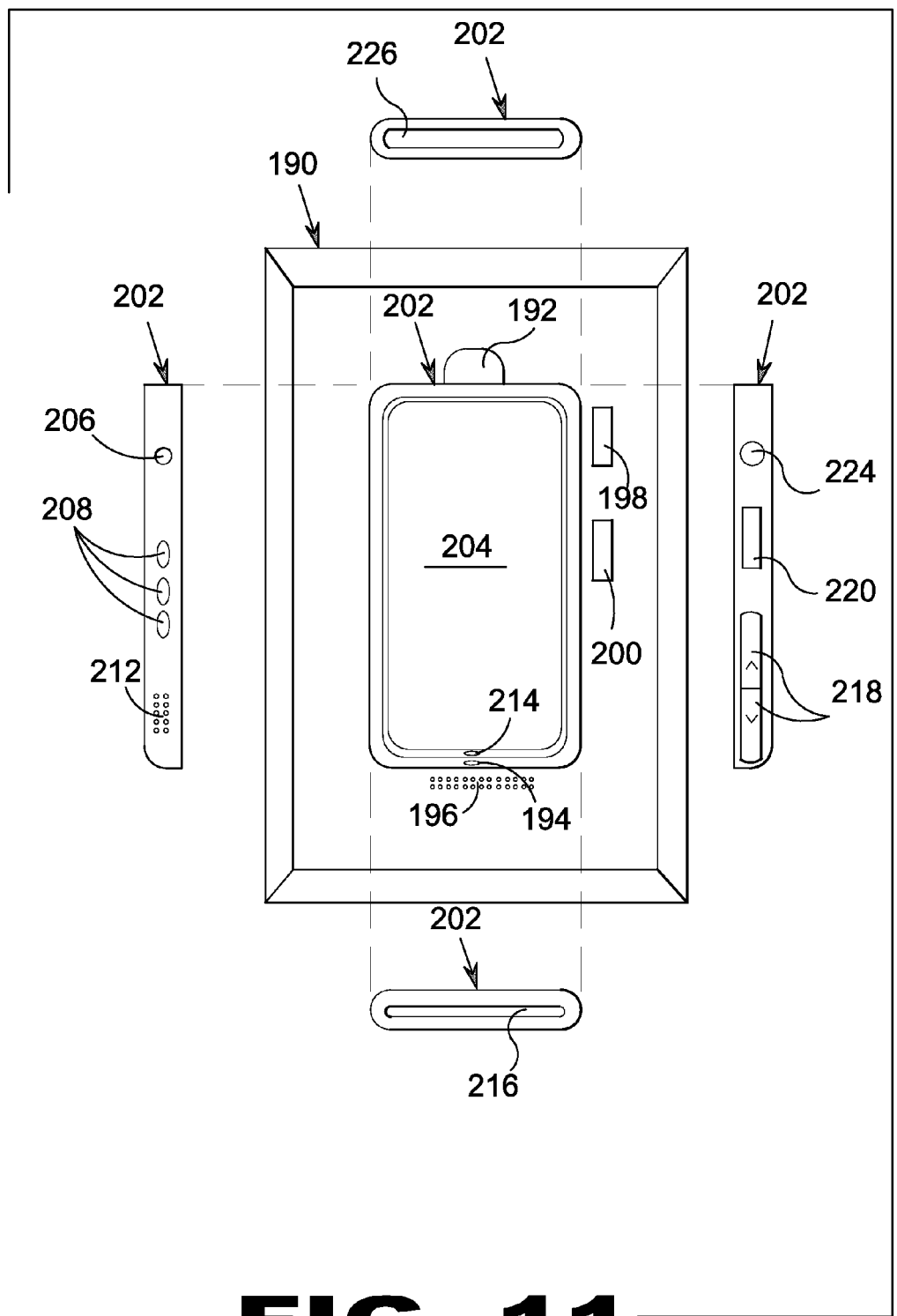
FIGS. 11 and 12 depict the voice activated wall mounted light switch and detachable universal remote control.
Figure 12:
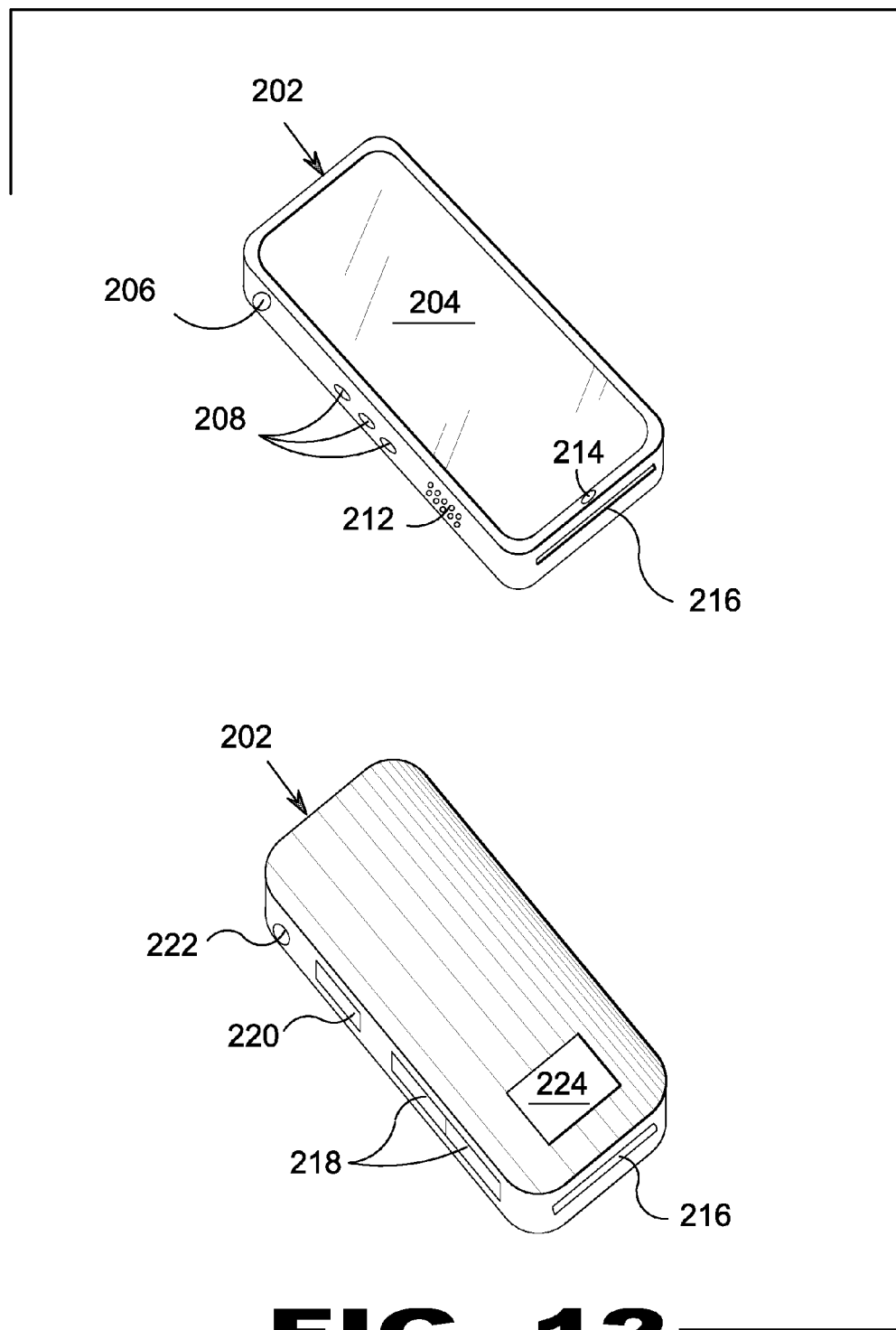

Referring to FIGS. 11 and 12, shown is the voice activated wall mounted light switch and detachable universal remote control. The light switch mount 190 will be constructed to fit all light switches currently available incorporating a button 192 used to release the universal remote 202 from its recess within the light switch mount.

It is envisioned that the base unit multimedia interface device and the light switch wall mounted portable multimedia interface device will both have the means to plug into a wall outlet. The base unit device will plug into a wall outlet the conventional way while the light switch wall mounted portable device will access power in the same fashion that a conventional light switch accesses power. The light switch wall mount device will have a housing from which the portable device can be detached from and connected to. It is the housing that will connect to the wall in the same manner that a convention light switch gets mounted to a wall.

The light switch mount will feature its own built in internal clock, calendar and Bluetooth/Wi Fi antenna to wirelessly interact with other interface devices verifying the accuracy of its time and date through them. Additionally provided is a microphone 194 and voice activation switch 200 allowing the user to verbally turn the lights in a room on and off, verbally set the alarm clock feature, and verbally ask for the time and date actuating an audible reply via speaker 196 of the correct time and/or date and a button 198 to manually turn the lights in a room on and off.

The universal remote control 202 comprises an on/off switch 222, touch screen display 204, microphone 214, speaker 212, control keys 208, scroll keys 218, headphone jack 206, infrared sensor 220, fingerprint scanner 224, memory card slot 226 and connector 216 to light switch wall mount.

The universal remote control 202 will be able to turn the light on and off and be able to lower and increase the intensity of light in a particular room manually via a menu command on its touch screen video display 204 and audibly via its microphone 214 and will be able to execute these functions wirelessly or when docked in the light switch 190 wall mount.

Having an internal alarm clock the universal remote control will also feature a new type of alarm clock function that will incorporate the increasing and decreasing of light intensity to aid in waking up a user. During the alarm the light can either increase from an off level to a bright level or have a strobe light effect. These features as well as "all" other features of this device can be operated via a menu of operation selections appearing on the touch screen video display or through voice activation.

The universal remote control will function as a cellular phone that can make wireless phone calls, wirelessly access the Internet, and wirelessly interact with the subscriber based central base station, the base unit, the base unit's remote control, the portable unit, the wireless headset/earpiece, and a laptop P/C all through Bluetooth, Wi-Fi, WiMAX, Wireless HDMI, Wireless HD, infrared and/or cellular frequencies through verbal and or manual commands from a user. It will also be able to access the Internet and/or the subscriber based central base station through a physical connection via USB connector port on the base unit and a laptop P/C.

The universal remote control will be able use the verbal and manual commands of the user to control its operations as well as to control the operations of all interface devices. It will also use the verbal and manual commands of the user to search and control the operation of the content stored on the its internal storage medium, search and control the operation of the content stored on attached memory cards with and without detachable re-chargeable batteries, search and control the operation of the content stored on CD/Blu-ray HD DVDs played internally on the base unit as well as on a laptop/PC, search and control the operation of the content stored on "all" other interface devices wirelessly via Bluetooth, Wi-Fi, WiMAX, Wireless HDMI, Wireless HD, infrared and/or cellular frequencies. It will also be able to search and control the operation of the content of all devices physically attached to the base unit via cable co-axle connector, audio/video connector, telephone jack/Ethernet connector, HDMI connector, S-video connector, DVI connector and/or the USB ports.

Visual feedback is provided to a user/subscriber via its own touch screen interactive video display. All operations as well as the interaction between the universal remote control and all other interface devices will also be visually displayed on its own touch screen display or on other video monitor/TVs, as well as, audibly played on speakers wirelessly and/or physically connected to it via Bluetooth, Wi-Fi, WiMAX, Wireless HDMI, Wireless HD, infrared, cellular frequencies and/or USB cable connector. The universal remote control will also perform as a game controller when playing interactive videos and/or games stored on its own storage medium, accessed through the base unit, the laptop/PC, and/or the central base station.

The universal remote control will be able to receive verbal commands 214 from a user during the playing of an interactive video game. For example, if the user were playing a first person game like "Halo", in addition to the user's physical input through the touch screen video display, control keys and buttons "during" live play of the game the user will also be able to use voice activation to supplement the play of the game whether it be to; start, pause and/or stop a game, change weapons or vehicles, change viewing angle, change character, etc.

The universal remote control will be able to store on its internal storage medium the audio and or video content received by CD/Blu-ray HD DVDs, memory cards with and without detachable re-chargeable batteries, the subscriber based central base station, and all other authorized interface devices that are connected to it wirelessly through Bluetooth, Wi-Fi, WiMAX, Wireless HDMI, Wireless HD, cellular, and infrared technologies and/or physically through the USB cable connector.

A memory card port 226 accepts both memory cards with and without a re-chargeable and detachable battery providing for recording and playing music, video, and interactive video games. The memory card port 226 on the universal remote control can both receive and give a power charge from and to an attached memory card with a re-chargeable and detachable battery—receive and provide a power charge from an attached memory card with a re-chargeable and detachable battery to add supplemental power to its own operations and give a power charge to an attached memory card with a re-chargeable and detachable battery when the universal remote control is connected to a power source (i.e. car lighter charger, a USB cable cord connected to a power outlet, USB cable cord connected to the base unit and/or laptop/PC). The detachable battery portion of the memory card with a re-chargeable and detachable battery can also be inserted into the memory card port of the universal remote control.

The universal remote control will also feature a fingerprint scanner 224. The use of which will be identical to the fingerprint scanner of the portable unit, the base unit, and the base unit remote control. The fingerprint scanner will allow a friend of the user/subscriber to use the fingerprint scanner on the user/subscriber's universal remote control to gain access to his/her own account, make a cellular phone call in his/her own account, and gain remote access to control "all" of his/her own interface devices. The friend of the user/subscriber will be able to "temporarily" transform the universal remote control of the user/subscriber into that of his/her own or into any other of his/her own interface devices. This feature will be accomplished by temporarily downloading the format of another user's profile onto someone else's device and/or accessing that profile through the central base station via the other person's universal remote control. This may require that the friend have fingerprint detection setup on his/her subscription with the same service provider as the user/subscriber.

The universal remote control will enable a user to provide audible commands to access the commercial and non-commercial references embedded onto voice/manually activated and integrated audio/video content through the use of a microphone. The universal remote control will also enable a user to provide manual/tactile commands to access the commercial and non-commercial references embedded onto voice/manually activated and integrated audio/video content through the use of its touch screen video display 204, scroll keys 218, control keys 208 and buttons.

The universal remote control will have the ability to vibrate when receiving a phone call. The vibrate feature can be used when playing interactive video games. Also, the user will be able to set the vibrate feature to accompany any mode on the universal remote control. This feature can be operated by voice and manual activation.

The universal remote control will be able to wirelessly transmit audio and/or video content to Wi-Fi, WiMAX, Bluetooth, Wireless HDMI, and Wireless HD enabled speakers, TVs and monitors. The universal remote control will also be capable of syncing with a Bluetooth headset/earpiece to enable the user/subscriber to have hands free and audible control of its operations.

There will also be a feature using GPS signals and an audible transponder within the universal remote control as well as all other interface devices that will allow them to locate each other whether they be in the same room, same house, or outside the home (lost or stolen).

The universal remote control will also function as a universal remote to control all other non interface devices—i.e. TV/monitors, DVD players, etc. It will function in similar fashion to all universal remote controls available today.

The universal remote control will have the ability to register itself and all other interface devices to a user/subscriber's account at the central database.

Figure 13:
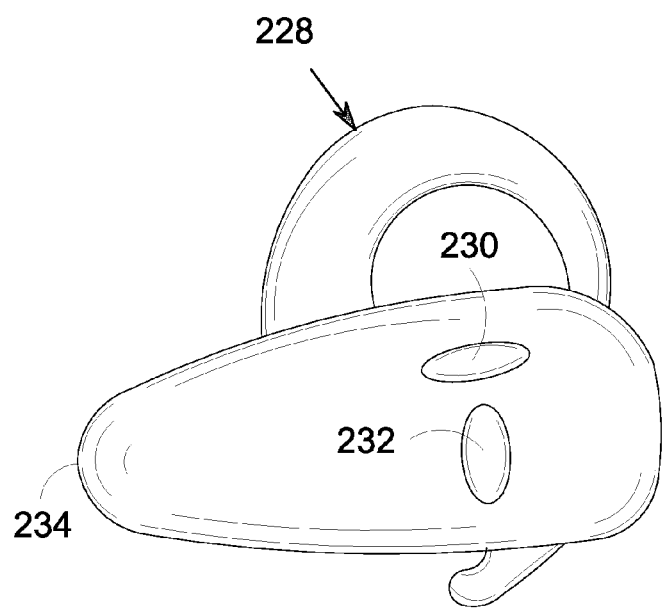
FIG. 13 is a front view of the wireless headset/earpiece.

Referring to FIG. 13 shown is a front view of the wireless headset/earpiece. The wireless headset/earpiece incorporates microphone 234, answer button 232 and mode button 230 that will enable it to function normally as a hands free way for a user/subscriber to have a cellular phone conversation. The user/subscriber will be capable of using the wireless headset/earpiece as a conduit to enable voice activation to control the operations of all other interface devices for which each will be synced to it. Through the use of voice activation the user/subscriber will also be able to control certain functions of the wireless headset/earpiece, itself, such as: to turn it on and off, adjust the volume, switch connection from one interface device to another interface device, find out how much battery life is left on it (to which the figurative amount remaining will be audibly communicated to the user through the speaker in the earpiece), etc.

Figure 14:
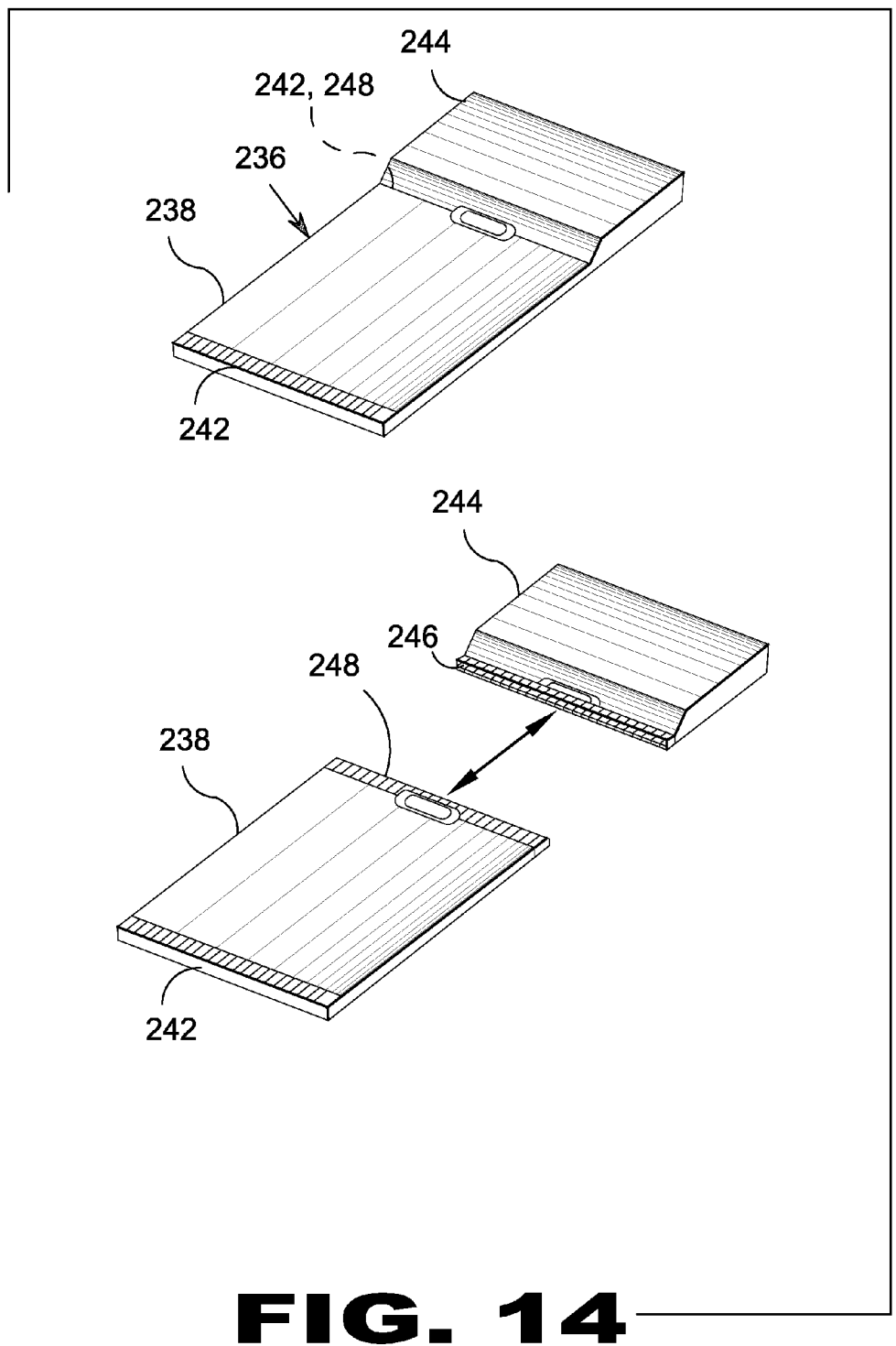
FIG. 14 is a perspective view of a memory card with and without a detachable re-chargeable battery.

Referring to FIG. 14 shown is a perspective view of a memory card with a detachable re-chargeable battery and that same memory card with the detachable re-chargeable battery separated from it. The memory storage device with detachable rechargeable battery portion 236 comprises a memory storage portion 238 having a battery connector 248 and a re-charger connection 242 mateable to the rechargeable battery 244 receptacle 246. The memory card ports on all interface devices (the portable unit, the base unit, the base unit's remote control, and the light switch/wall mounted universal remote control) will be capable of operating both memory cards with and without detachable re-chargeable batteries. Thereby allowing for the continued use of either the memory card portion and/or the detachable re-chargeable battery portion should either fail. The memory cards currently in use today will also function on all memory card ports on all interface devices. The detachable re-chargeable battery portion of the memory card can also be inserted into all memory card ports of all interface devices to either provide supplemental power or to be recharged.

Both the base unit and light switch wall mounted device will be the main source from which the memory card with detachable and rechargeable battery will receive a charge from. The memory card with detachable and rechargeable battery will be able to both give and receive a charge. It will give a charge to the portable device, the base unit remote control, or the portable section of the light switch wall mounted device when inserted to them to extend their use. However, the memory card with detachable and rechargeable battery will also be able to receive a charge when connected to the portable device, the base unit remote control, or the portable section of the light switch wall mounted device and these devices are in turn connected to the base unit or the light switch wall mounted housing by hardwire connection (USB plug) or by device inter-connection.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for integrating voice activation into digital video data comprising:
    retrieving digital pre-recorded or live broadcast video data that has been generated from an audio/video recording device, the digital pre-recorded or live broadcast video data including frames of video content; and
    editing the digital pre-recorded or live broadcast video data at a later time of the generation of the digital pre-recorded or live broadcast video data, by digitally embedding a question and answer retrieval system into at least one frame of the video content, the question and answer retrieval system including a command file, wherein the command file is a file digitally embedded in the digital pre-recorded or live broadcast video data, the command file further programmed to contain or access from a digital data storage source at least one question and a corresponding answer pertaining to what can be seen or heard on said at least one frame of the video content by an end-viewer and enabling said command file to be accessible upon selection of said at least one frame of the video content by said end-viewer during play of the digital pre-recorded or live broadcast video data on an audio/video playing device are created during the editing, and the question and answer retrieval system accessible via the command file by speech recognition of a voice command provided in a format of a natural language question by said end-viewer upon selection of said at least one frame of the video content by said end-viewer during play of the digital pre-recorded or live broadcast video data on the audio/video playing device;
    receiving, via the audio/video playing device upon selection of said at least one frame of the video content by said end-viewer, a given voice command provided in the format of a natural language question from the end-viewer to retrieve at least one question and a corresponding answer associated with said at least one frame of the video content from the question and answer retrieval system;
    retrieving, via the question and answer retrieval system from selection of said at least one frame of the video content by said end-viewer, the at least one question and a corresponding answer associated with said at least one frame of the video content from the command file; and
    providing, via the question and answer retrieval system from selection of said at least one frame of the video content by said end-viewer, the corresponding answer to said at least one question associated with said at least one frame of the video content visually or audibly to the end-viewer on the audio/video playing device.

2. The method of claim 1 comprising providing the end-viewer of said digital pre-recorded or live broadcast video data, the at least one question and the corresponding answer on at least one of a TV, a digital audio/video input device and a digital remote control, a touch screen digital audio/video control device, a digital stereo component device, and a computer.

3. The method of claim 1 comprising accessing an internet search process upon the end viewer of said digital pre-recorded or live broadcast video data accessing the at least one question and the corresponding answer.

4. The method of claim 1 comprising executing a purchase upon the end viewer of said digital pre-recorded or live broadcast video data accessing the at least one question and the corresponding answer.

5. The method of claim 1 comprising executing a related action upon the end viewer of said digital pre-recorded or live broadcast video data accessing the at least one question and the corresponding answer.

6. The method of claim 1 wherein the voice command is programmable and updateable.

7. The method of claim 1 wherein the at least one question and the corresponding answer include commands to access commercial and non-commercial references.

8. The method of claim 1 wherein said editing is applied to a plurality of forms of digital video data.

9. A method for integrating manual activation into digital video data comprising:
    retrieving digital pre-recorded or live broadcast video data that has been generated from an audio/video recording device, the digital pre-recorded or live broadcast video data including frames of video content; and
    editing the digital pre-recorded or live broadcast video data at a later time of the generation of the digital pre-recorded or live broadcast video data, by digitally embedding a question and answer retrieval system into at least one frame of the video content, the question and answer retrieval system including a command file, wherein the command file is a file digitally embedded in the digital pre-recorded or live broadcast video data, the command file further programmed to contain or access from a digital data storage source at least one question and a corresponding answer pertaining to what can be seen or heard on said at least one frame of the video content by an end-viewer and enabling said command file to be accessible upon selection of said at least one frame of the video content by said end-viewer during play of the digital pre-recorded or live broadcast video data on an audio/video playing device are created during the editing, and the question and answer retrieval system accessible via the command file by physical input of a manual command provided in a format of a natural language question by said end-viewer upon selection of said at least one frame of the video content by said end-viewer during play of the digital pre-recorded or live broadcast video data on the audio/video playing device;
    receiving, via the audio/video playing device upon selection of said at least one frame of the video content by said end-viewer, a given manual command provided in the format of a natural language question from the end-viewer to retrieve at least one question and a corresponding answer associated with said at least one frame of the video content from the question and answer retrieval system;
    retrieving, via the question and answer retrieval system from selection of said at least one frame of the video content by said end-viewer, the at least one question and a corresponding answer associated with said at least one frame of the video content from the command file; and providing, via the question and answer retrieval system from selection of said at least one frame of the video content by said end-viewer, the corresponding answer to said at least one question associated with said at least one frame of the video content visually or audibly to the end-viewer on the audio/video playing device.

10. The method of claim 9 comprising providing the end-viewer of said digital pre-recorded or live broadcast video data the at least one question and the corresponding answer on at least one of a TV, a digital audio/video input device and a digital remote control, a touch screen digital audio/video control device, a digital stereo component device, and a computer.

11. The method of claim 9 comprising accessing an internet search process upon the end viewer of said digital pre-recorded or live broadcast video data accessing the at least one question and the corresponding answer.

12. The method of claim 9 comprising executing a purchase upon the end viewer of said digital pre-recorded or live broadcast video data accessing the at least one question and the corresponding answer.

13. The method of claim 9 comprising executing a related action upon the end viewer of said digital pre-recorded or live broadcast video data accessing the at least one question and the corresponding answer.

14. The method of claim 9 wherein the manual command is programmable and updateable.

15. The method of claim 9 wherein the at least one question and the corresponding answer include commands to access commercial and non-commercial references.

16. The method of claim 9 wherein said editing is applied to a plurality of forms of digital video data.

17. A system for integrating command activation into digital audio or video data, the system comprising:
   a memory device having executable instructions stored therein; and
   a processing device, in response to the executable instructions, operative to:
      retrieve digital pre-recorded or live broadcast audio or video data that has been generated from an audio or video recording device, the digital pre-recorded or live broadcast audio or video data including frames of audio or video content, and
      edit the digital pre-recorded or live broadcast audio or video data at a later time of the generation of the digital pre-recorded or live broadcast audio or video data by digitally embedding a question and answer retrieval system into at least one frame of the audio or video content, the question and answer retrieval system including a command file, wherein the command file is a file digitally embedded in the digital pre-recorded or live broadcast video data, the command file further programmed to contain or access from a digital data storage source at least one question and a corresponding answer pertaining to what can be seen or heard on said at least one frame of the audio or video content by an end-user and enabling said command file to be accessible upon selection of said at least one frame of the audio or video content by said end-user during play of the digital pre-recorded or live broadcast audio or video data on an audio/video playing device are created during the editing, and the question and answer retrieval system accessible via the command file by a command provided in a format of a natural language question by said end-user upon selection of said at least one frame of the audio or video content by the end-user during play of the digital pre-recorded or live broadcast audio or video data on the audio/video playing device, the question and answer retrieval system is configured to receive, via the audio/video playing device upon selection of said at least one frame of the audio or video content by said end-user, a given command provided in the format of a natural language question from the end-user to retrieve at least one question and a corresponding answer associated with said at least one frame of the audio or video content from the question and answer retrieval system, retrieve, via the question and answer retrieval system from selection of said at least one frame of the audio or video content by said end-user, the at least one question and a corresponding answer associated with said at least one frame of the audio or video content from the command file, and provide, via the question and answer retrieval system from selection of said at least one frame of the audio or video content by said end-user, the corresponding answer to said at least one question associated with said at least one frame of the audio or video content audibly or visually to the end-user on the audio/video playing device.

18. The system of claim 17 wherein the question and answer retrieval system is operable by at least one of speech recognition of a voice command and physical input of a manual command.

19. An audio/video device for accessing commands embedded in digital audio or video data, the device comprising:
   a memory device having executable instructions stored therein; and
   a processing device, in response to the executable instructions, operative to:
      retrieve digital pre-recorded or live broadcast audio or video data that has been generated from an audio or video recording device, the digital pre-recorded or live broadcast audio or video data including frames of audio or video content,
      the digital pre-recorded or live broadcast audio or video data embedded with a question and answer retrieval system at a later time of the generation of the digital pre-recorded or live broadcast audio or video data, the question and answer retrieval system including a command file, wherein the command file is a file digitally embedded in the digital pre-recorded or live broadcast video data, the command file further programmed to contain or access from a digital data storage source at least one question and a corresponding answer pertaining to what can be seen or heard on said at least one frame of the audio or video content by an end-user and enabling said command file to be accessible upon selection of said at least one frame of the audio or video content by said end-user during play of the digital pre-recorded or live broadcast audio or video data on an audio/video playing device, and
      the question and answer retrieval system accessible via the command file by providing a command in a format of a natural language question by said end-user upon selection of said at least one frame of the audio or video content by the end-user during play of the digital pre-recorded or live broadcast audio or video data on the audio/video playing device, receive, via the audio/video playing device upon selection of said at least one frame of the audio or video content by said end-user, a given command provided in the format of a natural language question from the end-user to retrieve at least one question and a corresponding answer associated with said at least one frame of the audio or video content from the question and answer retrieval system, retrieve, via the question and answer retrieval system from selection of said at least one frame of the audio or video content by said end-user, the at least one question and a corresponding answer associated with said at least one frame of the audio or video content from the command file; and provide, via the question and answer retrieval system from selection of said at least one frame of the audio or video content by said end-user, the corresponding answer to said at least one question associated with said at least one frame of the audio or video content audibly or visually to the end-user on the audio/video playing device.

20. The system of claim 19 wherein the processing device is operative to receive the given command by at least one of speech recognition of a voice command and physical input of a manual command.

21. A system for integrating command activation into digital audio or video data, the system comprising:
a memory device having executable instructions stored therein; and
a processing device, in response to the executable instructions, operative to:
retrieve digital pre-recorded or live broadcast audio or video data that has been generated from an audio or video recording device, the digital pre-recorded or live broadcast audio or video data including frames of audio or video content, and
edit the digital pre-recorded or live broadcast audio or video data at a later time of the generation of the digital pre-recorded or live broadcast audio or video data by digitally embedding a request and response execution system into at least one frame of the audio or video content, the request and response execution system including a command file, wherein the command file is a file digitally embedded in the digital pre-recorded or live broadcast video data, the command file further programmed to contain or access from a digital data storage source at least one request and a corresponding response pertaining to what can be seen or heard on said at least one frame of the audio or video content by an end-user and enabling said command file to be accessible upon selection of said at least one frame of the audio or video content by said end-user during play of the digital pre-recorded or live broadcast audio or video data on an audio/video playing device are created during the editing, and the request and response execution system accessible via the command file by a command provided in a format of a natural language request by said end-user upon selection of said at least one frame of the audio or video content by the end-user during play of the digital pre-recorded or live broadcast audio or video data on the audio/video playing device, the request and response execution system is configured to receive, via the audio/video playing device upon selection of said at least one frame of the audio or video content by said end-user, a given command provided in the format of a natural language request from the end-user to execute at least one request and a corresponding response associated with said at least one frame of the audio or video content from the request and response execution system, execute, via the request and response execution system from selection of said at least one frame of the audio or video content by said end-user, the at least one request and a corresponding response associated with said at least one frame of the audio or video content from the command file, and provide, via the request and response execution system from selection of said at least one frame of the audio or video content by said end-user, the corresponding response to said at least one request associated with said at least one frame of the audio or video content audibly or visually to the end-user on the audio/video playing device.

22. The system of claim 21 wherein the request and response execution system is operable by at least one of speech recognition of a voice command and physical input of a manual command.

23. An audio/video device for accessing commands embedded in digital audio or video data, the device comprising:
a memory device having executable instructions stored therein; and
a processing device, in response to the executable instructions, operative to:
retrieve digital pre-recorded or live broadcast audio or video data that has been generated from an audio or video recording device, the digital pre-recorded or live broadcast audio or video data including frames of audio or video content, the digital pre-recorded or live broadcast audio or video data embedded with a request and response execution system at a later time of the generation of the digital pre-recorded or live broadcast audio or video data,
the request and response execution system including a command file, wherein the command file is a file digitally embedded in the digital pre-recorded or live broadcast video data, the command file further programmed to contain or access from a digital data storage source at least one request and a corresponding response pertaining to what can be seen or heard on said at least one frame of the audio or video content by an end-user and enabling said command file to be accessible upon selection of said at least one frame of the audio or video content by said end-user during play of the digital pre-recorded or live broadcast audio or video data on an audio/video playing device, and the request and response execution system accessible via the command file by providing a command in a format of a natural language request by said end-user upon selection of said at least one frame of the audio or video content by the end-user during play of the digital pre-recorded or live broadcast audio or video data on the audio/video playing device,
receive, via the audio/video playing device upon selection of said at least one frame of the audio or video content by said end-user, a given command provided in the format of a natural language request from the end-user to execute at least one request and a corresponding response associated with said at least one frame of the audio or video content from the request and response execution system, execute, via the request and response execution system from selection of said at least one frame of the audio or video content by said end-user, the at least one request and a corresponding response associated with said at least one frame of the audio or video content from the command file; and provide, via the request and response execution system from selection of said at least one frame of the audio or video content by said end-user, the corresponding response to said at least one request associated with said at least one frame of the audio or video content audibly or visually to the end-user on the audio/video playing device.

24. The system of claim 23 wherein the processing device is operative to receive the given command by at least one of speech recognition of a voice command and physical input of a manual command.

\* \* \* \* \*